United States Patent
Dodge et al.

(10) Patent No.: US 10,369,649 B2
(45) Date of Patent: Aug. 6, 2019

(54) CIRCUITS FOR IMPROVED WELDING PERFORMANCE

(71) Applicant: LINCOLN GLOBAL, INC., City of Industry, CA (US)

(72) Inventors: Robert L. Dodge, Mentor, OH (US); George B. Koprivnak, Painesville, OH (US); Steven R. Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1037 days.

(21) Appl. No.: 14/817,283

(22) Filed: Aug. 4, 2015

(65) Prior Publication Data
US 2016/0228970 A1    Aug. 11, 2016

Related U.S. Application Data

(60) Provisional application No. 62/112,405, filed on Feb. 5, 2015.

(51) Int. Cl.
*B23K 9/073* (2006.01)
*B23K 9/10* (2006.01)

(52) U.S. Cl.
CPC ............ *B23K 9/073* (2013.01); *B23K 9/1062* (2013.01); *B23K 9/1081* (2013.01)

(58) Field of Classification Search
CPC . B23K 9/092; B23K 9/09; B23K 9/23; B23K 9/173; B23K 9/095; B23K 9/1043; B23K 9/167; B23K 9/1075; B23K 9/1006; B23K 9/0738; B23K 35/3093; B23K 35/306
See application file for complete search history.

(56) References Cited

U.S. PATENT DOCUMENTS

| | | |
|---|---|---|
| 1,993,852 A | 3/1935 | Miller |
| 3,657,724 A | 4/1972 | Feeley et al. |
| 4,322,602 A | 3/1982 | Grist |
| 4,371,776 A | 2/1983 | Winn |
| 4,544,826 A | 10/1985 | Nakanishi et al. |
| 4,972,064 A | 11/1990 | Stava |
| 5,338,916 A | 8/1994 | Blankenship et al. |
| 5,343,017 A | 8/1994 | Karino et al. |
| 5,710,696 A * | 1/1998 | Reynolds ............. B23K 9/1043 363/132 |
| 5,958,261 A | 9/1999 | Offer et al. |
| 6,034,350 A | 3/2000 | Heraly et al. |

(Continued)

FOREIGN PATENT DOCUMENTS

| | | |
|---|---|---|
| CA | 2139715 | 8/1995 |
| DE | 19828869 | 12/1999 |

(Continued)

OTHER PUBLICATIONS

Dynasty 200 SD and DX TIG Welders; MillerWelds; 2 pgs.; http://www.millerwelds.com/products/tig.

(Continued)

*Primary Examiner* — Brian W Jennison

(57) ABSTRACT

Welding circuits including superposition elements that charge and discharge to assist with re-establishing a welding arc between an electrode and a workpiece after the arc is extinguished when a welding output current polarity changes are described.

14 Claims, 21 Drawing Sheets

(56) References Cited

U.S. PATENT DOCUMENTS

| | | | |
|---|---|---|---|
| 6,051,810 | A | 4/2000 | Stava |
| 6,215,100 | B1 | 4/2001 | Stava |
| 6,384,373 | B1 | 5/2002 | Schwartz |
| 6,833,529 | B2 | 12/2004 | Ueyama et al. |
| 7,385,159 | B2 | 6/2008 | Stava |
| 7,919,728 | B2 | 4/2011 | Era et al. |
| 8,067,714 | B2 | 11/2011 | Era et al. |
| 8,299,398 | B2 | 10/2012 | Madsen |
| 2004/0074884 | A1 | 4/2004 | Butler |
| 2007/0051712 | A1 | 3/2007 | Kooken et al. |
| 2008/0264915 | A1 | 10/2008 | Manthe et al. |
| 2012/0118865 | A1 | 5/2012 | Stava et al. |
| 2013/0162136 | A1 | 6/2013 | Baldwin et al. |
| 2014/0083987 | A1 | 3/2014 | Dodge et al. |
| 2014/0083989 | A1 | 3/2014 | Koprivnak et al. |
| 2014/0203006 | A1 | 7/2014 | Koprivnak et al. |

FOREIGN PATENT DOCUMENTS

| | | |
|---|---|---|
| DE | 20114660 | 2/2002 |
| DE | 10245368 | 4/2004 |
| EP | 0538227 | 4/1993 |
| GB | 1069512 | 5/1967 |
| GB | 2081156 | 2/1982 |
| JP | 63171267 | 7/1988 |
| JP | 2002096167 | 4/2002 |
| WO | 9839138 | 9/1998 |

OTHER PUBLICATIONS

PCT/IB13/002113—International Preliminary Report on Patentability and Written Opinion of the International Searching Authority—dated Apr. 2, 2015.

PCT/IB13/002523—International Preliminary Report on Patentability and Written Opinion of the International Searching Authority—dated May 28, 2015.

Extended European Search Report issued on EP Application 16000292.9, dated Jul. 14, 2016.

* cited by examiner

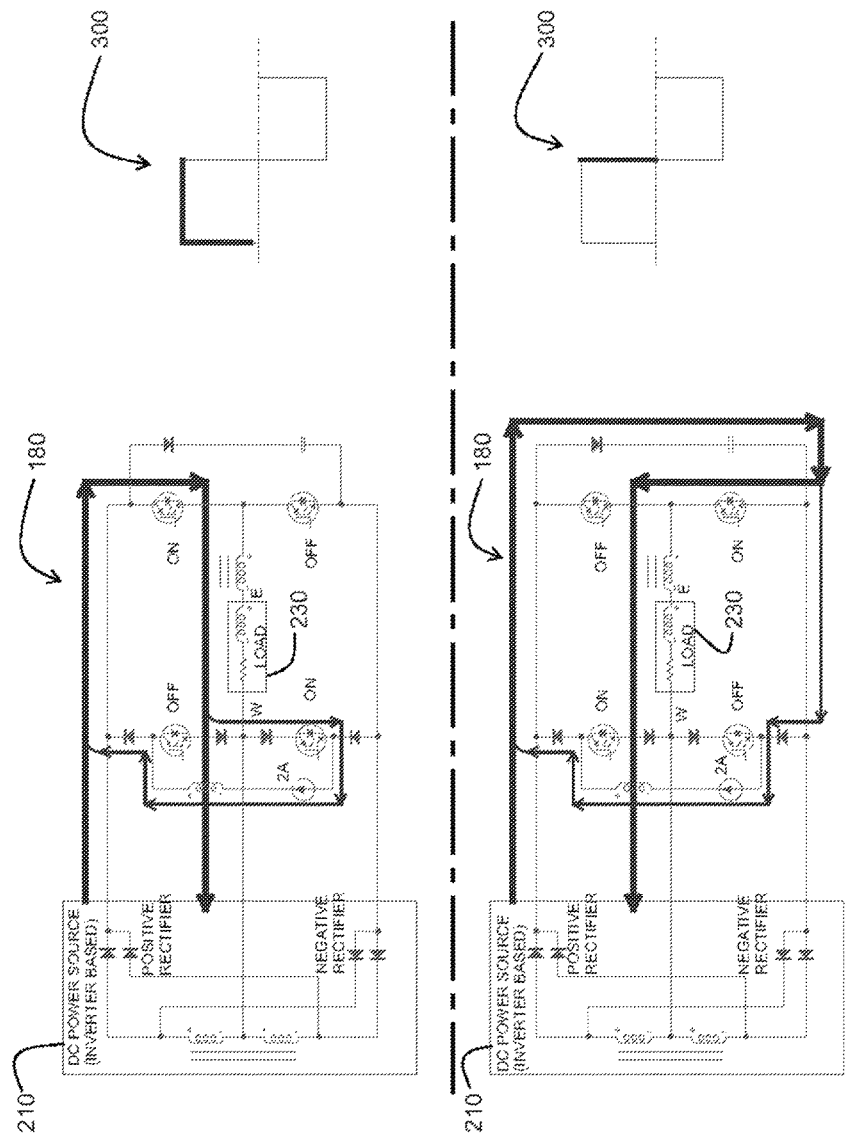

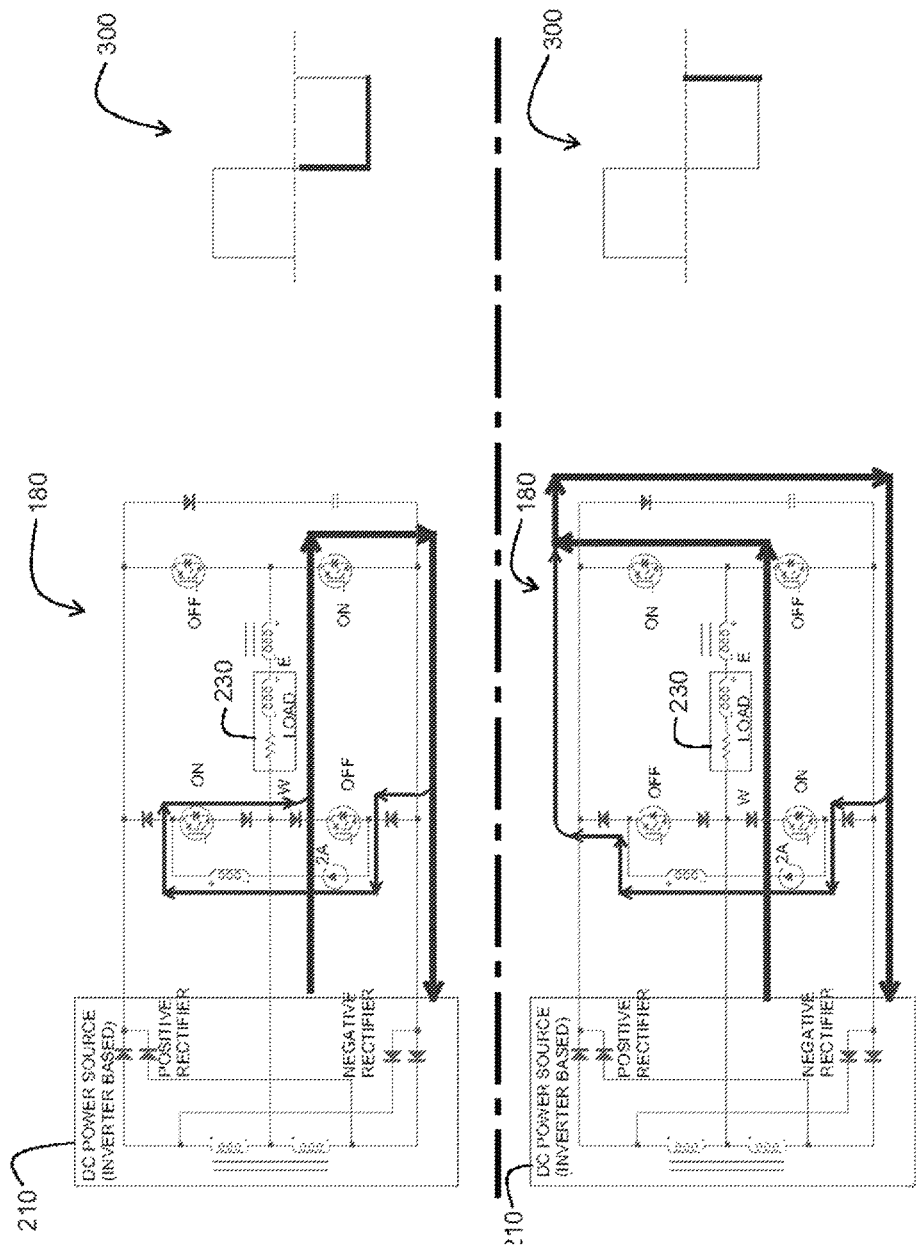

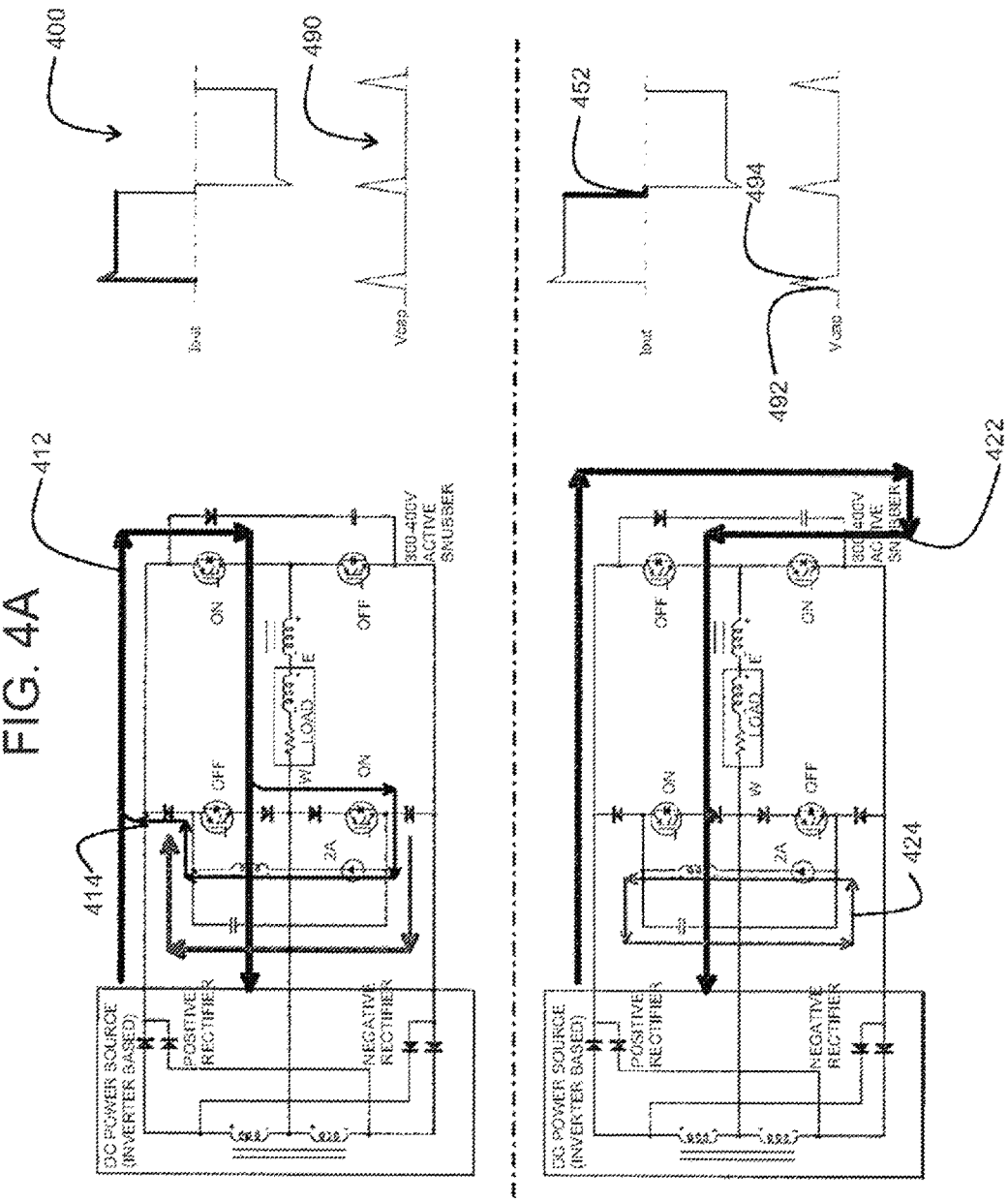

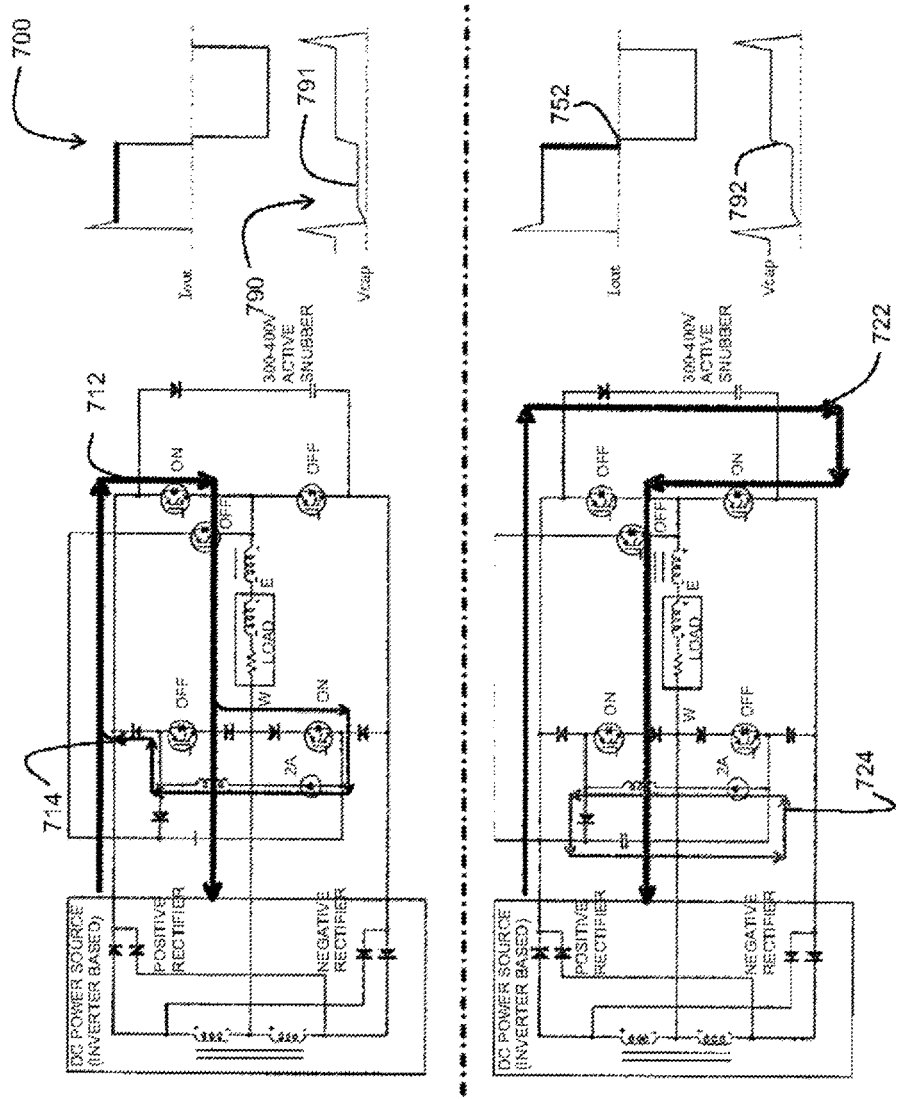

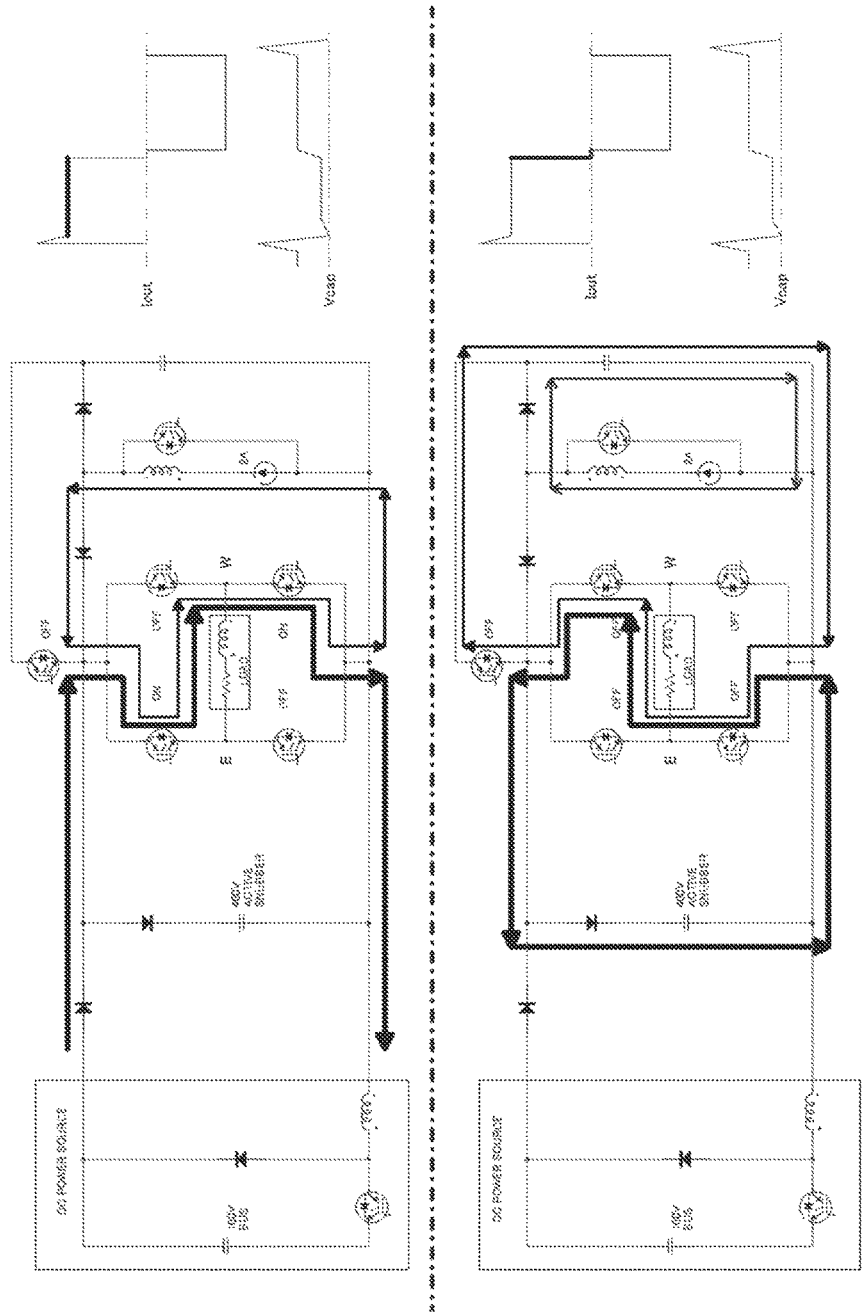

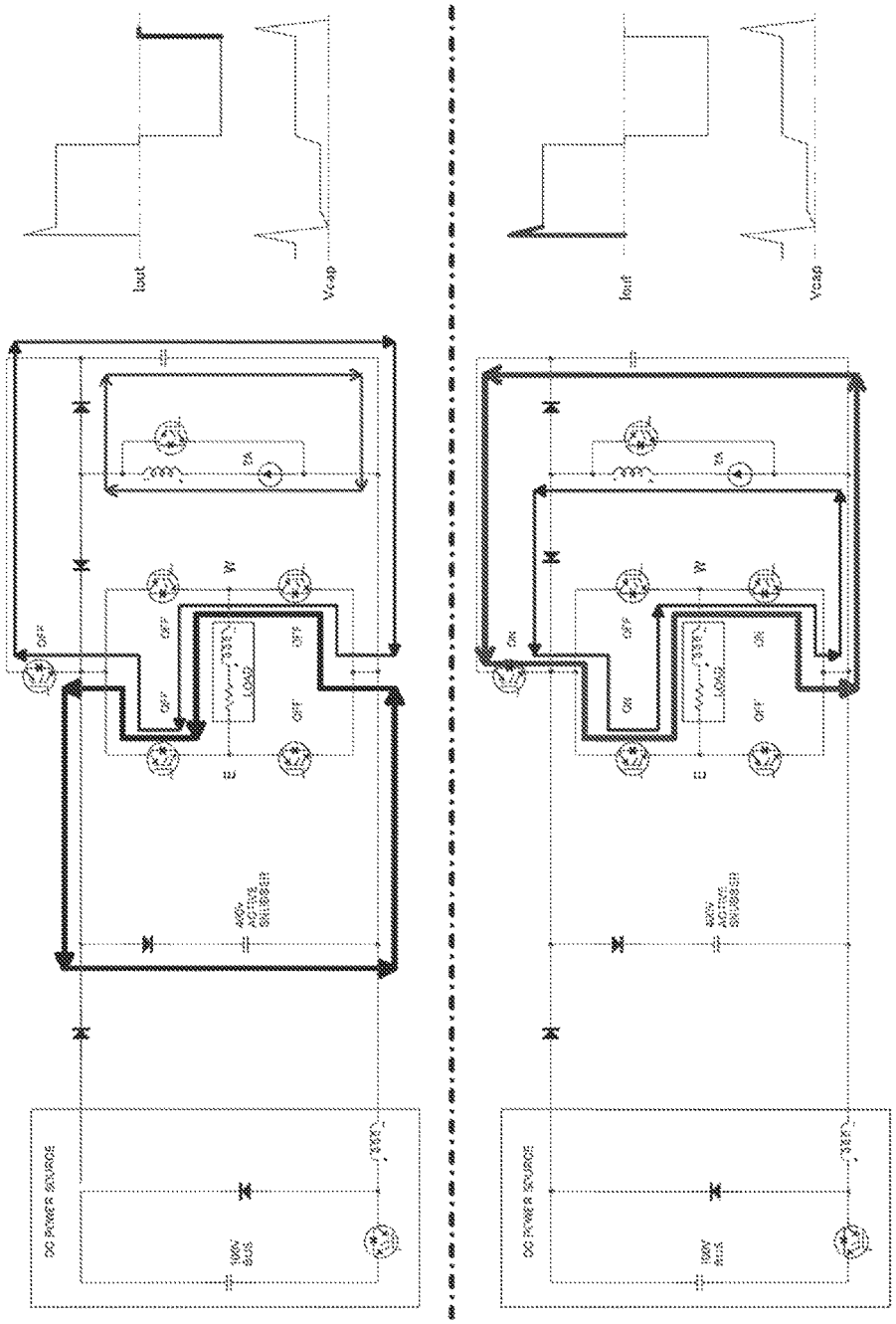

CIRCUITS FOR IMPROVED WELDING PERFORMANCE

CROSS-REFERENCE TO RELATED APPLICATION

This U.S. patent application claims priority to and the benefit of Provisional U.S. Patent Application Ser. No. 62/112,405 filed on Feb. 5, 2015, which is incorporated by reference herein in its entirety.

TECHNICAL FIELD

Certain embodiments of the present invention relate to arc welding. More particularly, certain embodiments of the present invention relate to systems and methods for providing improved welding bridge circuitry facilitating arc establishment and stability, as well as weld quality.

BACKGROUND

In alternating current (AC) arc welding, the current must have an instantaneous value of zero as the polarity of the output current changes. As current decreases, it can permit cooling of the weld puddle and a reduction in metallic gases which assist in stability and establishment of the arc after the zero cross. Initial establishment or re-establishment of a low impedance arc can be challenging.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

Embodiments herein can include a system, comprising a welding power conversion circuit configured to convert an input current to an output current, a plurality of switches and corresponding current paths. The current paths include at least a positive polarity main switch on a positive polarity current main path, the positive polarity current main path includes a welding path from an electrode to a workpiece, a positive polarity auxiliary switch on a positive polarity current auxiliary path and a polarity transition auxiliary path, a negative polarity main switch on a negative polarity current main path, the negative polarity current main path includes the welding path from the workpiece to the electrode, a negative polarity auxiliary switch on a negative polarity current auxiliary path and the polarity transition auxiliary path, and an independent discharge control switch on an independent discharge control current path. The system further includes a controller configured to switch at least one of the plurality of switches; and a superposition element configured to discharge stored energy in response to a polarity change in the output current, the superposition element configured to charge at least when current flows through the polarity transition auxiliary path.

An embodiment of techniques herein includes a method comprising converting an input current to an output current in a welding power source, switching a welding current direction through at least a positive polarity current main path and a negative polarity current main path, switching an auxiliary current direction through at least a positive polarity current auxiliary path, negative polarity current auxiliary path, and a polarity transition auxiliary path, charging a superposition element using at least the polarity transition auxiliary path, and inducing a voltage through at least one of the positive polarity current main path and negative polarity current main path in response to a change in an output current polarity, the voltage is induced by discharging the superposition element through an independent discharge control current path.

Another embodiment of the present innovation includes a system comprising means for converting an input current to an output current in a welding power source, means for switching a welding current direction through at least a positive polarity current main path and a negative polarity current main path, and means for switching an auxiliary current direction through at least a positive polarity current auxiliary path, negative polarity current auxiliary path, and a polarity transition auxiliary path. There are additionally means for charging a superposition element using at least the polarity transition auxiliary path, and means for inducing a voltage through at least one of the positive polarity current main path and negative polarity current main path in response to a change in an output current polarity, the voltage is induced by discharging the superposition element through an independent discharge control current path.

Details of illustrated embodiments of the present invention will be more fully understood from the following description and drawings.

BRIEF DESCRIPTION OF THE DRAWINGS

FIGS. 3A-3C illustrate the operation of the welding power source similar to that of FIG. 2 when implementing an AC welding output current waveform;

FIGS. 4A and 4B illustrate the operation of the welding power source in FIG. 2 when implementing an AC welding output current waveform;

FIGS. 7A-7C illustrate the operation of the welding power source in FIG. 6 when implementing an AC welding output current waveform;

FIGS. 9A-9C illustrate the operation of the welding power source in FIG. 8 when implementing an AC welding output current waveform;

DETAILED DESCRIPTION

Figure 1:
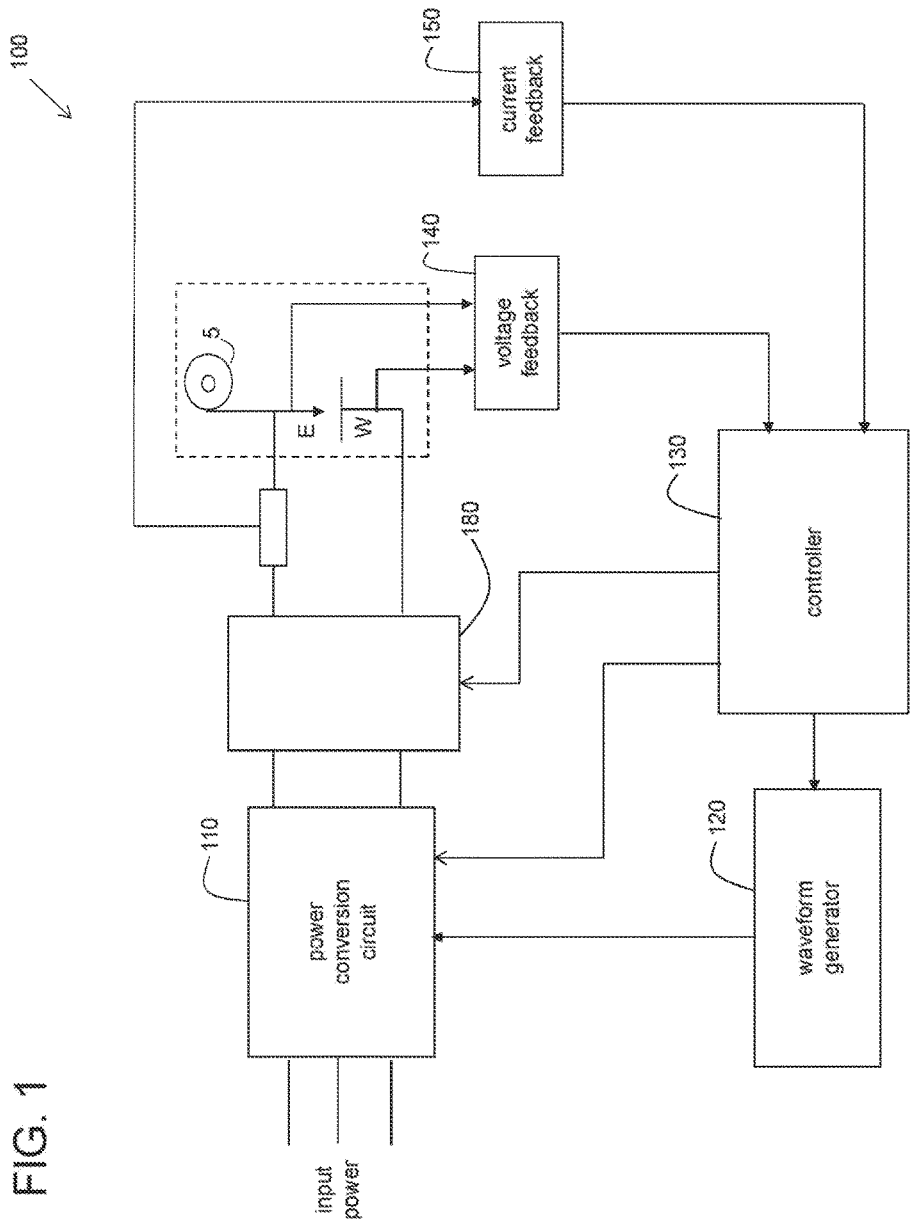
FIG. 1 illustrates a schematic block diagram of an exemplary embodiment of a welding power source operatively connected to a welding electrode and a workpiece.

As noted above, establishing an arc and maintaining its quality can present challenges in some environments. For example, the arc may initially jump to the workpiece at undesired directions or angles, the resulting high impedance arc requires energy to re-focus into the low impedance state required for a typical welding power source to sustain. The inability to deliver this instantaneous energy can result in low-quality or inefficient welding processes.

The plasma column associated with low current arc welding tends to be unstable and can lead to undesired arc outages. Additionally, for AC welding processes, the arc current stops and changes direction during the zero transition. Depending on the state of the arc plasma and gases surrounding the weld, the arc may or may not re-ignite. Embodiments of the present invention include a low current arc regulation circuit providing a well-controlled current with a significant amount of inductance providing a high energy constant current source to stabilize the arc plasma. During a polarity change, the arc current decays to zero prior to advancing in the opposite polarity. During this polarity transition time, both the current from the arc and the arc regulation circuit flows into a high voltage snubber circuit. In embodiments, there can be a deadtime (incidental or intentional period of arc shutoff) at or around the polarity change. In any instance, the high voltage imposed by the snubber circuit rapidly depletes all of the arc energy. However, only a small portion of the arc regulation circuit energy is depleted. When the energy of the weld circuit inductance is depleted, the welding output is able to reverse polarity. The arc re-ignition voltage is provided by energy stored in the inductor of the arc regulation circuit and is limited by the high voltage snubber circuit. In embodiments having a deadtime, a superposition element charges because the deadtime prevents current flow back through the arc. In embodiments where the deadtime is intentionally provided to facilitate charging of a superposition element for use reigniting the arc, the deadtime must be limited to prevent excess cooling of the weld puddle which will prevent re-establishment. Once the arc is re-established, the current from the arc regulation circuit is diverted back to the arc, and the voltage collapses back to that which is required to maintain the arc.

The innovations disclosed herein therefore relate, in some embodiments, to welding circuitry including one or more stability and/or background paths for maintaining arc stability as well as the inclusion of one or more superposition circuits which provide a surge of energy for arc establishment or re-establishment. Superposition elements (including but not limited to, e.g., one or more capacitors) can be located at various positions in circuitry. While capacitors are discussed in the following details, it is understood that other circuit elements may be utilized to accomplish similar effects, and this disclosure is intended to embrace all such variants for accomplishing similar functions.

In embodiments, the superposition element is sized such that it will charge to a minimum voltage (e.g., a re-ignition threshold) without depleting the energy stored in a background/stabilizer circuit or element. The superposition element must also be large enough to store sufficient energy to re-establish a low impedance arc plasma. The voltage required for arc re-ignition varies by process. To provide an example, even demanding tungsten inert gas (TIG) arcs (e.g., negative to positive with 100% argon gas) may be consistently re-ignited at, e.g., 300V, which can therefore be identified as the re-ignition voltage. In alternative embodiments, re-ignition can be accomplished in similar or different arcs at 150V, 100V, or less than 100V.

The amount of energy required to establish a low impedance plasma arc depends primarily on the load. Initially, the load inductance (e.g., choke, cable, HF transformer, et cetera) and capacitance (e.g., bypass, stray, et cetera) absorb a significant portion of the energy. In embodiments, the remaining energy stored in the superposition element is sufficient to drive the peak current high enough to establish a low impedance arc. In embodiments, this value is between, e.g., 30 and 100 amps.

This disclosure includes various explicit and implicit definitions of terms that may be used throughout the description and claims. Both singular and plural forms of all terms fall within each terminology.

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

"Welding tool", as used herein, refers to, but is not limited to, a welding gun, a welding torch, or any welding device that accepts a consumable or non-consumable welding electrode for the purpose of applying electrical power to the welding electrode provided by a welding power source.

"Welding output circuit path", as used herein, refers to an electrical path from a first side of the welding output of a welding power source, through a first welding cable (or a first side of a welding cable), to a welding electrode, to a workpiece (either through a short or an arc between the welding electrode and the workpiece), through a second welding cable (or a second side of a welding cable), and back to a second side of the welding output of the welding power source. Other circuit paths will be defined and described with respect to the drawings below.

"Welding cable", as used herein, refers to an electrical cable that may be connected between a welding power source and a welding electrode and workpiece (e.g. through a welding wire feeder) to provide electrical power to create an arc between the welding electrode and the workpiece.

"Welding output", as used herein, may refer to the electrical output circuitry or output port or terminals of a welding power source, or to the electrical power, voltage, or current provided by the electrical output circuitry or output port of a welding power source, or to the load connected to an output of a welding power source.

"Computer memory", as used herein, refers to a storage device configured to store digital data or information which can be retrieved by a computer or processing element.

"Controller", as used herein, refers to a logic circuitry and/or processing elements and associated software or program involved in controlling a welding power source.

The terms "signal", "data", and "information" may be used interchangeably herein and may be in digital or analog form.

The term "AC welding" is used generally herein and may refer to actual AC welding. In the claims, AC welding will be specifically used to refer to welding with an alternating current. However, where discussed in the description, a reference to AC welding is not intended to exclude or prohibit alternatives such as DC welding in both positive and negative polarities, variable polarity welding, and other hybrid welding processes. In this regard, the disclosure should be construed as inclusive and conjunctive, rather than exclusive and disjunctive, of alternative embodiments accordingly embraced. However, as noted above, where expressly claimed, AC, DC positive, DC negative, variable polarity welding, and/or other hybrid welding processes should be construed only as the recited technique.

A "dual charge" arrangement of superposition configurations in here provide for charging a superposition element during two polarity changes, but only discharging the superposition element to assist with arc re-establishment for one polarity change. This may also be referred to as "dual charge, single discharge" or "full-cycle charge, half-cycle discharge" for purposes of describing the arrangement and function.

In embodiments of a "dual charge" superposition configuration, a superposition element can be connected directly across a background current source and the background inductor. In such embodiments, the inductor charges the superposition element during a deadtime between polarities, and the superposition element would then release stored energy to the load when the bridge is turned back ON in either polarity. This cycle occurs at each polarity change in such embodiments. In further embodiments, energy storage may be limited at low background current levels. Such limitation can be caused by, e.g., the tolerable deadtime between cycles and inductor current. In simple terms, increasing deadtime may permit more charge to be imparted to the superposition element (e.g., capacitor), but may simultaneously permit weld puddle cooling to a degree that interferes with arc re-establishment after the deadtime.

In further embodiments avoiding the energy restriction by deadtime, the superposition element charges on both half cycles, but will only release energy on the negative to positive transition. This is because, in some configurations, negative to positive transition can be more difficult to re-establish than positive to negative. A dual cycle charging with single cycle release technique minimizes the required deadtime per cycle to charge while maximizing the stored energy because there are two deadtime periods to recharge the superposition element for every discharge of the superposition element's stored energy. In some embodiments, the arc in a positive to negative transition is re-ignited using the background inductor energy because the background inductor energy is a sufficient voltage supplement for the less demanding positive to negative transition without discharge of a superposition element; and the arc in a negative to positive transition is re-ignited at least in part using the energy stored in the capacitor over two charging events throughout an entire cycle.

Such configurations can be realized in a number of ways. In an embodiment, the top of the superposition element is reconnected directly to the positive bus (cathode of diode instead of anode). By this method, the superposition element discharges when the positive switch is turned ON. In at least one embodiment, the superposition element only discharges when the positive switch is ON, but alternative embodiments are possible. Both this and the Applicant's alternative "dual charge" methods can in embodiments create a freewheeling path through the capacitor after it is discharged. A freewheeling path can adversely affect the background current delivered to the arc under some circumstances. Such concerns can be overcome utilizing an additional switch to provide a dedicated energy discharge path from the capacitor directly to the arc. The switch can then be turned OFF immediately after the capacitor discharges, preventing loss or redirection of the background current with respect to the load (e.g., by unintentional freewheeling current paths). A further benefit of such configurations is that the superposition element will charge to the arc voltage during the remainder of the positive cycle, thereby reducing the length of deadtime required to reach the desired re-ignition voltage level (e.g., stored energy).

Embodiments herein can utilize an alternate current path. The alternate current path can be varied depending on topology. In embodiments, the alternate current path may or may not be routed through the output bridge circuit (including, e.g., a main power source welding current path). For full bridge output embodiments, both welding (output) bridge and background (alternate) path share one or more (up to, but not necessarily, all) switches of the same bridge. For embodiments which utilize a half bridge output, the alternate path shares welding bridge switches with the welding output, but may utilize a second set of switches to complete the reversal path. In hybrid bridge embodiments, a half bridge output is used for the power source welding current, and a separate full bridge is utilized as the background/alternate path. Hybrid bridge embodiments may include only one shared path through the load.

In some embodiments, configurations herein are used with a unipolar current source for the alternate path. In embodiments, this further utilizes a full bridge path to change the polarity of the background current. It is possible to have a bipolar current source supplying the background (e.g., as in FIG. 2). Assuming the main power welding source also had a bipolar output, both sources (welding and background) may require only one shared half bridge output.

Aspects herein can include a welding apparatus, comprising a power source configured to supply at least a welding output current, an output bridge circuit configured to switch a current path of the output current between a welding output path and a polarity transition path based on changing polarity in the output current, an alternate polarity transition circuit including at least a portion of the polarity transition path, the parallel polarity transition circuit is configured to induce a voltage between an electrode and a workpiece of the welding output path sufficient to stabilize a welding arc during polarity transition of the output current, and one or more superposition elements configured to provide a voltage between the electrode and the workpiece sufficient for arc re-ignition and focusing during polarity transition of the output current.

In at least one embodiment, the power source provides a dual polarity output. In at least one embodiment, the output bridge circuit is a half bridge topology. In at least one embodiment, the power source provides a single polarity output. In at least one embodiment, the output bridge circuit is a full bridge topology. In at least one embodiment, the alternate polarity transition circuit charges at least one of the one or more superposition elements during a deadtime at each polarity transition. In at least one embodiment, the deadtime is predefined. In at least one embodiment, each polarity transition is a zero-cross transition. In at least one embodiment, the alternate polarity transition circuit aids in arc re-establishment. In at least one embodiment, the alternate polarity transition circuit aids in arc re-establishment up to a background current value.

In at least one embodiment, at least one of the one or more superposition elements charges at each zero cross. In at least one embodiment, at least one of the one or more superposition elements charge during a deadtime. In at least one embodiment, at least one of the one or more superposition elements absorbs output weld (cable inductance) current energy during weld current decay. In at least one embodiment, at least one of the one or more superposition elements provides controlled discharge during a re-establishment phase. In at least one embodiment, at least one of the one or more superposition elements provides controlled discharge during a negative to positive transition. In at least one embodiment, at least one of the one or more superposition elements utilizes a dual charge, single discharge technique which minimizes required deadtime and maximizes energy storage.

Turning to the drawings, FIG. 1 illustrates a schematic block diagram of an exemplary embodiment of a welding power source 100 operatively connected to a welding electrode E and a workpiece W. The welding power source 100 includes a power conversion circuit 110 providing welding output power between the welding electrode E and the workpiece W. Power source 100 can be any power source, including those that provide single polarity output with respect to common/ground, as well as alternatively those that provide dual polarity output with respect to common/ground. An optional wire feeder 5 may feed a consumable wire welding electrode E toward the workpiece W. Alternatively, as in a GTAW process, the electrode E may be non-consumable and the wire feeder 5 may not be used, or may be used to provide a filler wire toward the workpiece W. The wire feeder 5, the consumable welding electrode E, and the workpiece W are not part of the welding power source 100 but may be operatively connected to the welding power source 100 via a welding output cable.

The welding power source 100 further includes a waveform generator 120 and a controller 130. The waveform generator 120 generates welding waveforms at the command of the controller 130. A waveform generated by the waveform generator 120 modulates the output of the power conversion circuit 110 to produce the welding output current between the electrode E and the workpiece W.

The welding power source 100 may further include a voltage feedback circuit 140 and a current feedback circuit 150 to monitor the welding output voltage and current between the electrode E and the workpiece W and provide the monitored voltage and current back to the controller 130. The feedback voltage and current may be used by the controller 130 to make decisions with respect to modifying the welding waveform generated by the waveform generator 120 and/or to make other decisions that affect safe operation of the welding power source 100, for example.

The welding power source 100 can also include a current switching circuit 180. In embodiments, a current switching circuit can include a bridge circuit operatively connected to the power conversion circuit 110 and is configured to switch a direction of the output current through a low impedance welding output circuit path (including the electrode E and the workpiece W) operatively connected to a welding output of the welding power source 100 at the command of the controller 130. The arc regulation circuit is operatively connected to the bridge circuit and is configured to provide a well-regulated low value current supply to stabilize low end welding and assist in current transitions in polarity about zero (e.g., by inducing a voltage between the electrode E and the workpiece W of the welding output circuit path that is sufficient to re-ignite the arc during a polarity transition of the output current). Detailed examples and operation of such bridge and arc regulating circuits are described in detail later herein.

Figure 2:
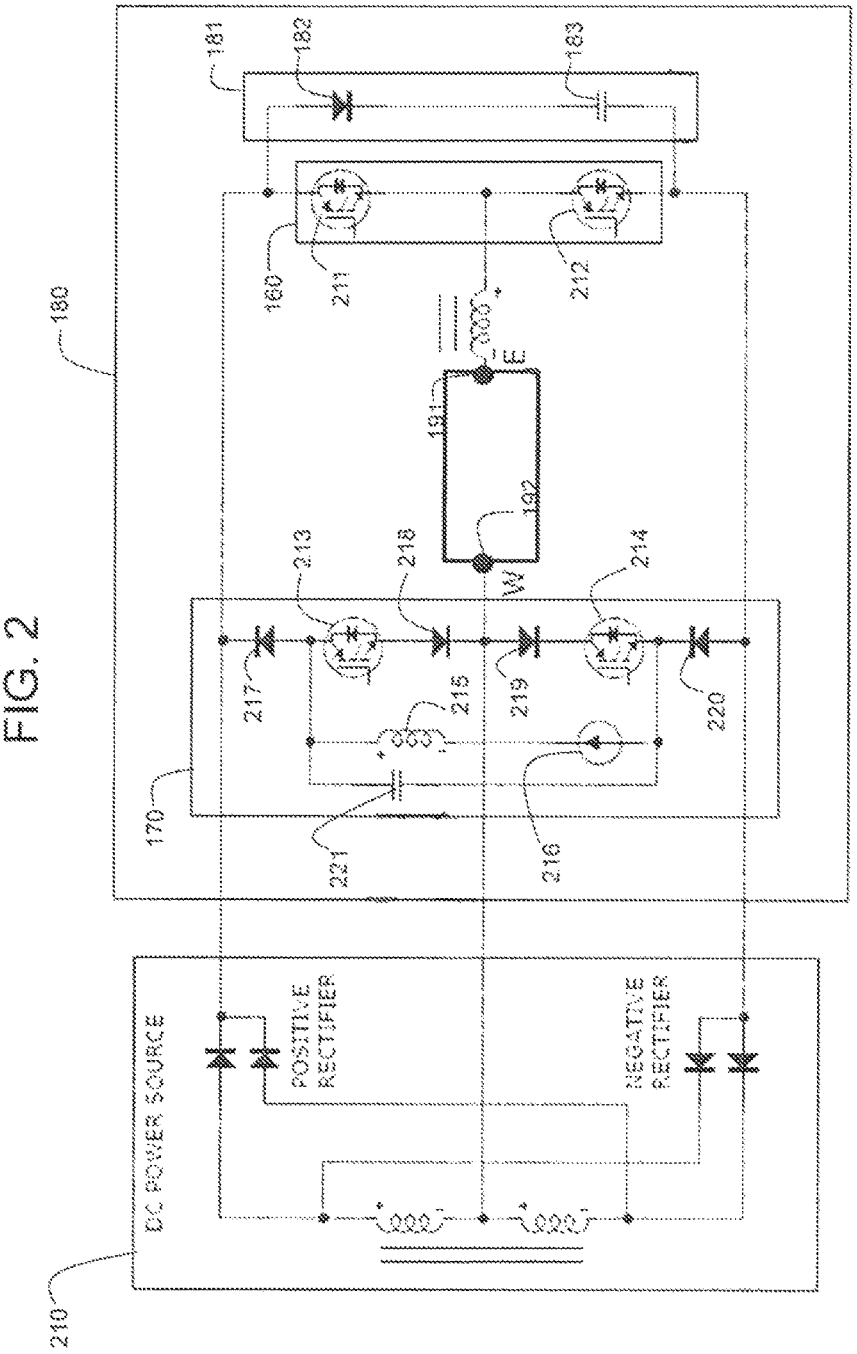
FIG. 2 illustrates a schematic diagram of a first embodiment of a portion of the welding power source of FIG. 1.

FIG. 2 illustrates a schematic diagram of an example embodiment of a portion of the welding power source 100 of FIG. 1 having in current switching circuit 180 a bridge circuit 160 and a bi-polar arc regulation circuit 170. Also illustrated in FIG. 2 is a portion 210 of the power conversion circuit 110, where the power conversion circuit 110 is a center-tapped or half bridge topology (e.g., an inverter-based circuit). The current switching circuit 180 of FIG. 2 is in the form of a half bridge topology where the power conversion circuit 110 provides dual output current paths configured to share a common path, such that each output path can induce a flow of opposite polarity in the shared path.

The bridge circuit 160 includes switching transistors 211 and 212. The arc regulation circuit 170 includes switching transistors 213 and 214, inductor 215, constant current source 216, diodes 217-220 and, optionally, superposition capacitor 221. In accordance with an embodiment, the switching transistors are insulated gate bipolar transistors (IGBTs). However, other types of switching transistors may be used as well (e.g., metal-oxide semiconductor field effect transistors or MOSFETs), in accordance with other embodiments. In accordance with an embodiment, the constant current source may be adjustable (e.g., between 2 amps and 10 amps). An active snubber circuit 181, having a diode 182 and a capacitor 183, is used to limit the voltage across the current switching circuit 180 (e.g., somewhere between 300 V and 600 V) to cause the output current through the output circuit path to decay quickly and limit or bound the arc re-ignition voltage level. The anti-parallel diodes of the switching transistors 211 and 212 carry the snubber/decay current. Pre-charging of the inductor (e.g., by shorting across the transistors of the arc regulation circuit 170) may be desired such that the inductor has stored energy and is ready to perform initial arc ignition functions (at the start of the welding process) or arc re-ignition functions (at zero crossings) more quickly.

The optional superposition capacitor 221 of the arc regulation circuit 170 may be used to provide a modest overshoot through zero current during polarity switching. The capacitor 221 may store energy from the inductor of the arc regulation circuit during the bridge deadtime. The energy may be released when the arc is re-established in the opposite polarity, providing an extra boost or overshoot in addition to the current provided by the constant current source and inductor.

Figure 3B:
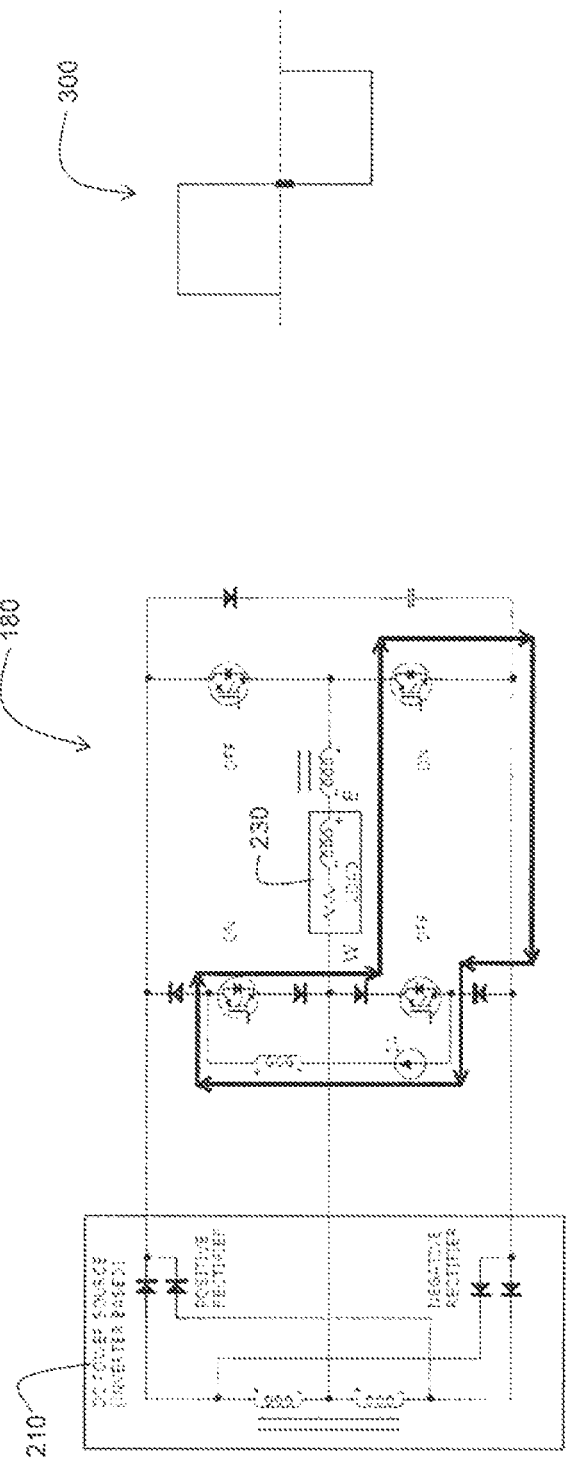

The current switching circuit 180 of FIG. 2 provides for AC welding operation and induces a voltage at the welding output of the welding power source being of sufficient magnitude to re-establish the welding arc between the electrode E and the workpiece W during polarity reversals of the welding process, as described herein with respect to FIGS. 3A-3C. Welding output terminals 191 and 192 are shown and represent the welding output of the welding power source to which the electrode E and the workpiece W may be connected through a welding cable path.

In accordance with an embodiment, the inductor 215 has an inductance value of between about 10 to 100 millihenries (usually much larger than the overall inductance of the welding output circuit path) and the constant current source 216 provides a constant current in the range of 2 amps to 10 amps. The constant current source 216 may be any of several different types including, for example, a chopper buck regulator or a simple voltage source and a resistor. The inductor is sized to provide a relatively stable current while inducing a large enough voltage between the electrode and the workpiece to quickly and reliably re-ignite the arc immediately after the arc goes out due to the output current switching direction (polarity reversal/switching). During zero current crossing (polarity reversal/switching), the arc extinguishes when the current reaches zero and the high voltage (e.g., 200 to 400 VDC) induced by the energy from the inductor 215 of the arc regulation circuit 170 is used to re-establish the arc in the opposite polarity. The inductor 215 keeps current flowing and induces the high voltage up to the limit set by the snubber circuit 181 (e.g., 400 VDC). The inductor 215 is capable of inducing the high voltage level in either polarity as determined by the state of the switching transistors 213 and 214 in conjunction with switching transistors 211 and 212 (i.e., when crossing the zero current point from either direction).

In accordance with an embodiment, the switching transistors and the diodes in the arc regulation circuit carry only a background current (e.g., less than 2-10 amps), and the switching transistors of the bridge circuit are shared to complete the full bridge path of the arc regulation circuit. The diodes in the arc regulation circuit block both power source current and the unintentional free-wheeling current path formed by the legs of the arc regulation circuit. The switching transistors in the arc regulation circuit may be used to form a simple boost supply that may be used to pre-charge the capacitor of the snubber circuit (with the bridge circuit OFF). Similarly the switching transistors in the arc regulation circuit may be used to pre-charge the inductor of the arc regulation circuit. In accordance with an embodiment, a 100 milli-henry inductor may be charged to 10 amps in about 20 milli-seconds (assuming a 50V differential between the arc voltage and the voltage supply for the current source). Therefore, the time to start and stabilize a GTAW process (or any other process) in DC should be more than sufficient to pre-charge the inductor of the arc regulation circuit without any additional means.

FIGS. 3A-3C illustrate the operation of a welding power source similar to that of FIG. 2 (i.e., without 212) when implementing an AC welding output current waveform. It is noted that while AC welding output current waveforms are described here (and elsewhere throughout this disclosure) as a simple square waveform, it is understood that other waveforms, including more complex waveforms, can be embraced according to the discussion herein. The load 230 shown in FIGS. 3A-3C represents the resistance and inductance of the arc between the electrode E and the workpiece W and the welding cable path connecting the electrode E and workpiece W to the welding power source (i.e., the welding output circuit path). The electrode E, workpiece W, and the welding cable path are not a part of the welding power source, however.

Referring to the top portion of FIG. 3A, during the positive current portion of an AC waveform 300 (see thicker dark lines of the waveform 300) produced by the welding power source, current flows predominantly from the power conversion circuit 210, through the switching transistor 211 of the bridge circuit 160, through the load 230 (in the positive direction), and back to the power conversion circuit 210 through the common path (see thick arrows). Also, a low regulated current, provided by the arc regulation circuit 170, flows from the constant current source 216, through the inductor 215 (storing energy in the inductor), through the diode 217, through the switching transistor 211 of the bridge circuit 160, through the load 230 (in the positive direction), through the diode 219 and the switching transistor 214 of the arc regulation circuit 170, and back to the constant current source 216 (see less thick arrows).

Referring to the bottom portion of FIG. 3A, during the positive current decay portion of the AC waveform 300 (see thicker dark line of the waveform 300), the load 230 effectively acts as a power source, trying to keep current flowing. Current flows from the load 230, through the power conversion circuit 210 (in a free-wheeling manner), through the active snubber circuit 181, through the anti-parallel diode of the switching transistor 212 of the bridge circuit 160, and back to the load 230 (in the positive direction, see thick arrows) until the current fully decays. Also, a low regulated current, provided by the arc regulation circuit 170, flows from the constant current source 216, through the inductor 215 (storing energy in the inductor), through the diode 217, through the snubber circuit 181, through the diode 220 of the arc regulation circuit 170, and back to the constant current source 216 (see less thick arrows). Even when current through the load 230 has fully decayed, the current from the arc regulation circuit 170 keeps flowing as described.

During current decay, the bridge circuit 160 changes polarity. However, as long as the arc current is still positive, the inductor 215 bleeds off through the high voltage path created by the snubber circuit 181. The arc regulation circuit 170 provides 2-10 amps into the snubber circuit 181. As the current through the load drops toward zero, the arc extinguishes and the arc regulation circuit applies a high voltage across the load to re-ignite the arc in the opposite polarity.

Referring to FIG. 3B, during the polarity transition portion of the AC waveform 300 (see thicker dark line of the waveform 300), no significant current is provided by the power conversion circuit 210. The arc between the electrode E and the workpiece W briefly extinguishes. However, energy stored in the inductor 215 induces an arc-igniting voltage between the electrode E and the workpiece W. Current from the power conversion circuit can begin to flow again through the load in the opposite direction. The arc current re-establishes quickly and any under-shoot or over-shoot of the welding output current is controlled by the inductor 215. Without the arc regulation circuit, the power conversion circuit would attempt to re-establish the arc. However, since the voltage provided by the power conversion circuit is usually limited (e.g., to 100 VDC), re-establishment of the arc may not occur. When, the energy from the inductor 215 of the arc regulation circuit 170 is released, current flows from the inductor 215 through the switching transistor 213, through the diode 218, through the load 230 (in the negative direction), through the switching transistor 212 of the bridge circuit 160, through the diode 220, through the constant current source 216, and back to the inductor 215 (see arrows). As a result, the arc between the electrode E and the workpiece W quickly re-ignites in the negative direction and settles to a voltage level low enough for the power source to provide current.

Referring to the top portion of FIG. 3C, during the negative current portion of the AC waveform 300 (see thicker dark lines of the waveform 300) produced by the welding power source, current flows predominantly from the power conversion circuit 210, through the load 230 (in the negative direction), through the switching transistor 212 of the bridge circuit 160, and back to the power conversion circuit 210 (see thick arrows). Also, a low regulated current, provided by the arc regulation circuit 170, flows from the constant current source 216, through the inductor 215 (storing energy in the inductor), through the switching transistor 213, through the diode 218, through the load 230 (in the negative direction), through the switching transistor 212 of the bridge circuit 160, through the diode 220 of the arc regulation circuit 170, and back to the constant current source 216 (see less thick arrows).

Referring to the bottom portion of FIG. 3C, during the negative current decay portion of the AC waveform 300 (see thicker dark line of the waveform 300), the load 230 effectively acts as a power source, trying to keep current flowing. Current flows from the load 230, through the anti-parallel diode of the switching transistor 211 of the bridge circuit 160, through the active snubber circuit 181, through the power conversion circuit 210 (in a free-wheeling manner), and back to the load 230 (see thick arrows). Also, a low regulated current, provided by the arc regulation circuit 170, flows from the constant current source 216, through the inductor 215 (storing energy in the inductor), through the diode 217, through the snubber circuit 181, through the diode 220 of the arc regulation circuit 170, and back to the constant current source 216 (see less thick arrows). Even when current through the load 230 has fully decayed, the current from the arc regulation circuit 170 keeps flowing as described.

Upon making the transition back to the positive portion of the waveform 300 (i.e., the waveform is repeating), in a similar manner to that of FIG. 3B, the inductor 215 will release its stored energy through the load (but in the positive direction) via the diode 217, the switching transistor 211, the diode 219, the switching transistor 214, and the constant current source 216, causing the arc between the electrode E and the workpiece W to quickly re-ignite in the positive direction. The arc regulation circuit 170 continuously adds a well-regulated low value of current to the welding output current provided by the power source to stabilize the arc as the current provided by the power conversion circuit decreases toward zero, and to immediately re-ignite the arc in the opposite polarity.

Figure 4B:
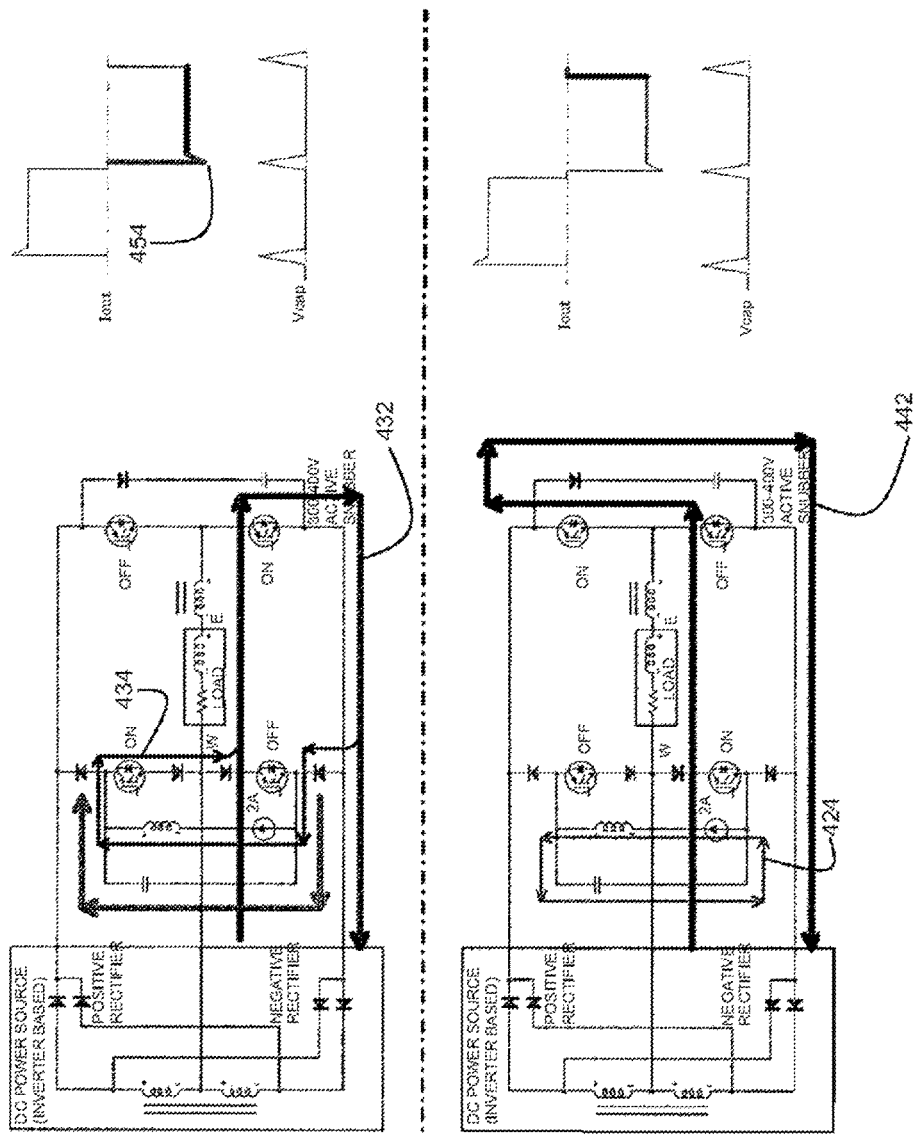

FIGS. 4A and 4B illustrate the operation of the welding power source in FIG. 2 according to different operating parameters using superposition capacitor 221. While superposition capacitor 221 is shown in FIG. 2, such is indicated as optional in embodiments, and not included in the aspects illustrated in FIGS. 3A to 3C.

FIG. 4A first shows positive portion of the current output waveform 400. Capacitor charge waveform 490 is shown below and corresponding to current output waveform 400. During this time, current flows through the load from electrode to workpiece (positive polarity) using positive polarity current main path 412. Simultaneously, current flows through positive polarity current auxiliary path 414, supplementing the output current with the background current to assist with re-establishment of an arc at the beginning of a positive portion. FIG. 4A also shows an overshoot on the positive side immediately following a negative-to-positive transition as a result of discharging superposition capacitor 221 through diode 217, switch 211, and the load, then returning back through diode 219 and switch 214.

FIG. 4A also thereafter shows positive-to-negative polarity transition illustrated in current output waveform 400. In FIGS. 4A and 4B, deadtime 452 is illustrated, which is a period of time during which no current flows through the arc before the arc is re-established with the output current flowing in polarity opposite to that of the previously established arc. While the current is decaying until the deadtime, the output current flows through positive-to-negative transition main path 422. Due to switching at the polarity transition and deadtime, current also flows through transition current auxiliary path 424, which charges superposition capacitor 221. This is shown on charging side 492 of capacitor charge waveform 490, which has a duration corresponding to the deadtime 452 as illustrated. In alternative embodiments, the period associated with charging side 492 may have a longer or shorter time.

FIG. 4B begins by showing the negative portion of current output waveform 400 after the positive portion and polarity transition. Negative portion initially includes overshoot 454, which corresponds to the discharge of superposition capacitor 221 used to assist in re-establishing the arc in negative polarity. This is shown by discharging side 494 of capacitor charging waveform 490, when the capacitor voltage returns to its un-charged level. During the negative portion of current output waveform 400, current flows through the load from workpiece to electrode (negative polarity) using negative current main path 432. Simultaneously, current flows through negative current auxiliary path 434, supplementing the output current with the background current to assist with re-establishment of an arc at the beginning of a negative portion.

FIG. 4B also thereafter shows negative-to-positive polarity transition illustrated in current output waveform 400. Once again, deadtime 452 is illustrated, which is a period of time during which no current flows through the arc before the arc is re-established with the output current flowing in polarity opposite to that of the previously established arc. While the current is decaying until deadtime 452, the output current flows through negative-to-positive transition main path 442. Due to switching at the polarity transition and deadtime, current also flows through transition current auxiliary path 424, which charges superposition capacitor 221. This is again shown on charging side 492 of capacitor charge waveform 490, which has a duration corresponding to the deadtime 452 as illustrated. In alternative embodiments, the period associated with charging side 492 may have a longer or shorter time.

The cycle can repeat as needed, changing between positive and negative polarity, for the duration of a welding operation. The cycle illustrated in, e.g., FIGS. 4A and 4B is an example of a dual-charge, dual-discharge arrangement in which the capacitor charges each half-cycle (over the deadtime for both polarity changes in cycle) and discharges each half-cycle (assisting arc re-establishment in both polarities).

Figure 5A:
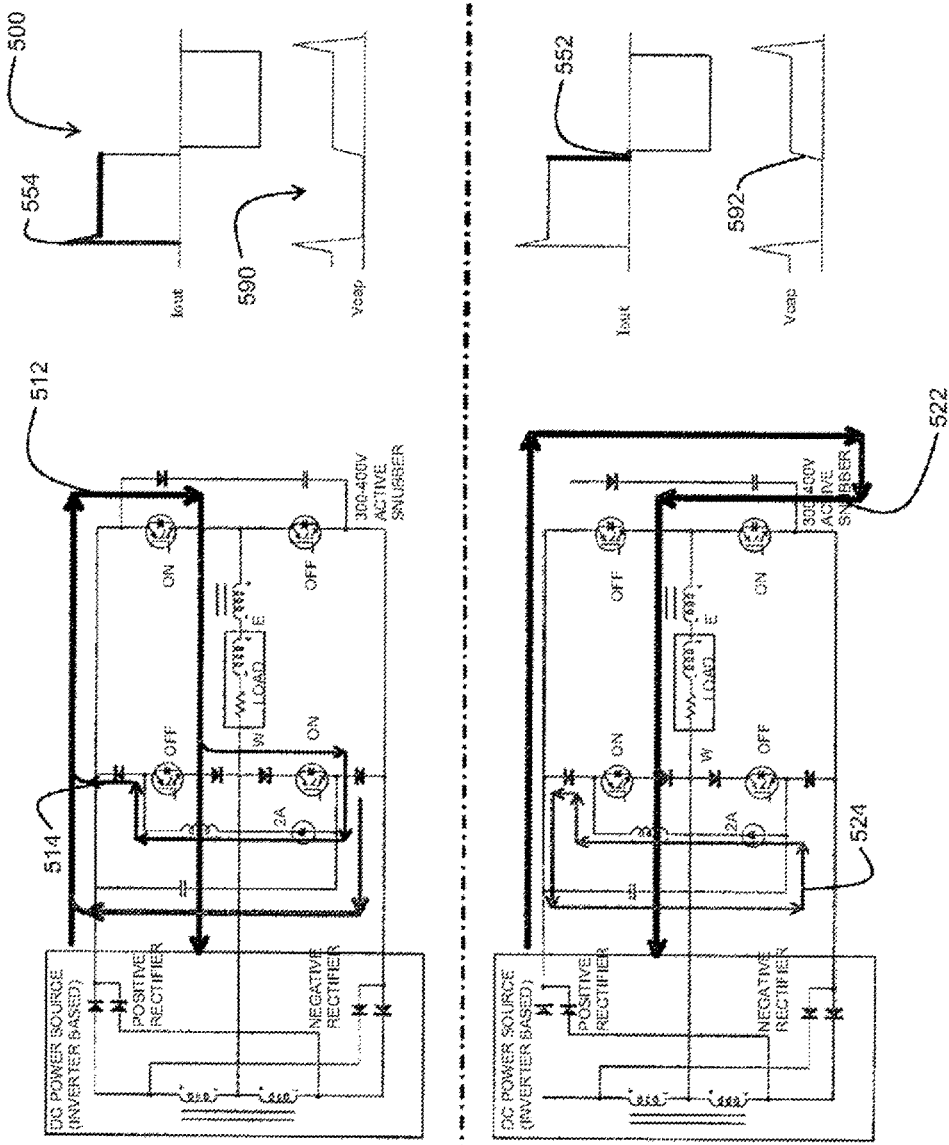
FIGS. 5A and 5B illustrate the operation of the welding power source similar to that of FIG. 2 when implementing an AC welding output current waveform.
Figure 5B:
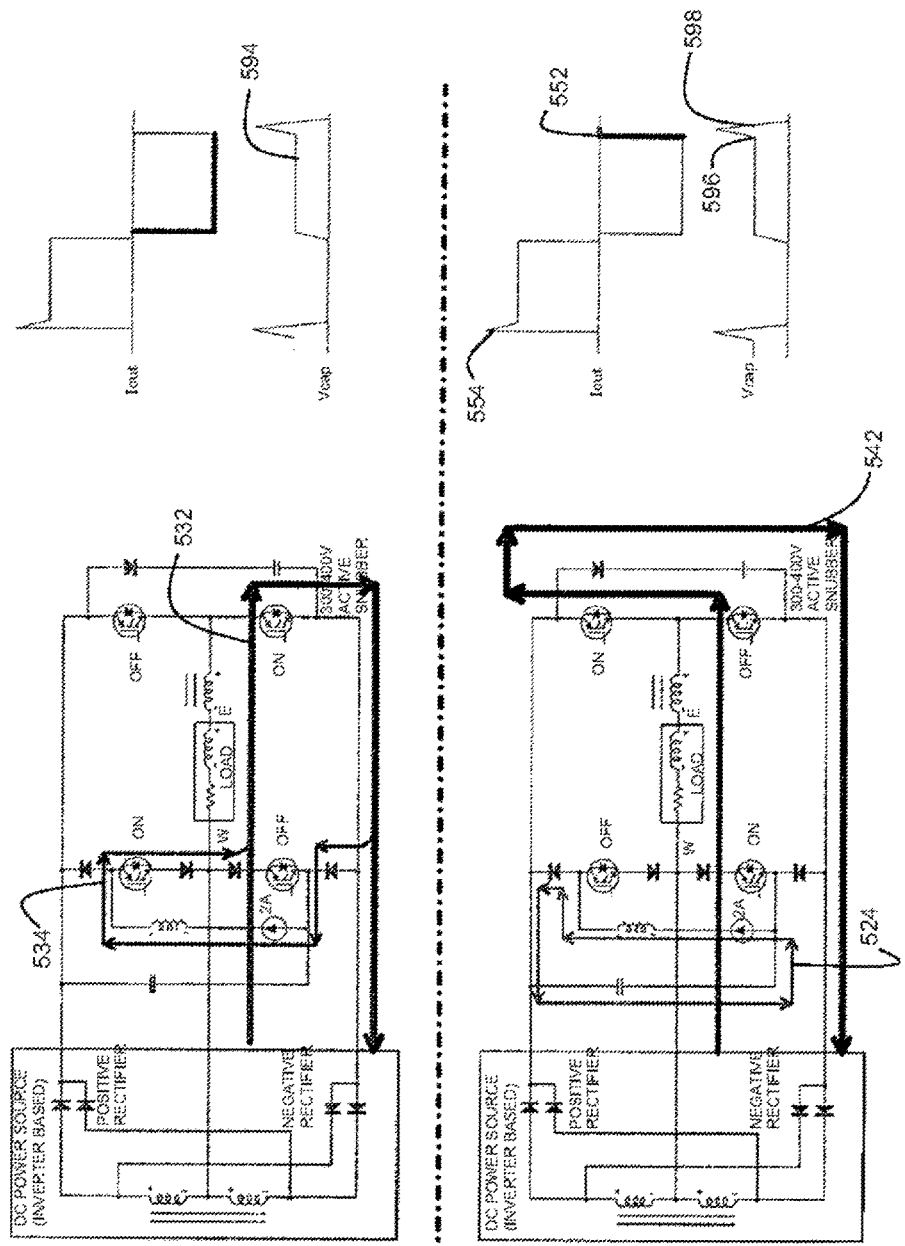

FIGS. 5A and 5B, illustrate an arrangement similar to that of FIG. 4 where switching occurs to facilitate a dual-charge, single-discharge arrangement in which the capacitor charges each half-cycle but discharges only once per full cycle (assisting arc re-establishment when transitioning to only one polarity). In an embodiment, the superposition capacitor 221 discharges only when the output polarity is transitioning from negative to positive. The charging and discharging can be regulated by, e.g., switches 211, 212, 213, and 214, as well as the activity of power source 210. Because energy is related to the square of voltage, discharging only once per full polarity cycle provides a significantly larger benefit to arc re-establishment while minimizing deadtime during which superposition capacitor 221 charges. As noted, reducing deadtime prevents excess cooling of the weld puddle, which can interfere with arc stability and quality.

FIGS. 5A and 5B show an arrangement similar, but not identical, to that of FIG. 2. Specifically, capacitor 212 is connected directly to the positive rail in the configuration of FIGS. 5A and 5B. In this regard, FIG. 5A first shows the establishment and duration of a positive portion of output current waveform 500. Overshoot 554 is shown at the beginning of the positive portion due to the discharge of superposition capacitor 221 during the transition from negative to positive output polarity. As can be seen, no overshoot exists in the negative portion (discussed hereafter) because superposition capacitor 221 charges but does not discharge during the positive to negative transition. Capacitor voltage waveform 590 shows the voltage of superposition capacitor 221 drop to 0 (or another background level) once the output current increases above zero (after any deadtime) in positive polarity. During the positive portion of output current waveform 500, output current flows through positive polarity current main path 512 and positive polarity current auxiliary path 514.

FIG. 5A also shows the polarity transition between positive and negative polarities in output current waveform 500 including deadtime 552. During deadtime 552, charging side 592 is visible in capacitor voltage waveform 590, as superposition capacitor 221 charges while current flows through transition current auxiliary path 524 at least during deadtime 552. Current also flows through positive-to-negative transition main path 522 during the positive to negative polarity transition (e.g., as the main welding current decays).

FIG. 5B shows the establishment and duration of a negative portion of output current waveform 500. As shown, no overshoot exists, because no discharge followed the charging of superposition capacitor 221 due to the ON/OFF settings of switches 211, 212, 213, and 214. Capacitor voltage waveform 590 remains stable through inactivity period 594. Current flows through negative current main path 532 and negative current auxiliary path 534.

FIG. 5B also shows the polarity transition between positive and negative polarities in output current waveform 500 including deadtime 552. During deadtime 552, second charging side 596 is visible in capacitor voltage waveform 590, as superposition capacitor 221 charges a second time while current flows through transition current auxiliary path 524 at least during deadtime 552. Current also flows through negative-to-positive transition main path 542 during the positive to negative polarity transition (e.g., as the main welding current decays). Following deadtime 552, the cycle repeats as shown in FIG. 5A.

Figure 6:
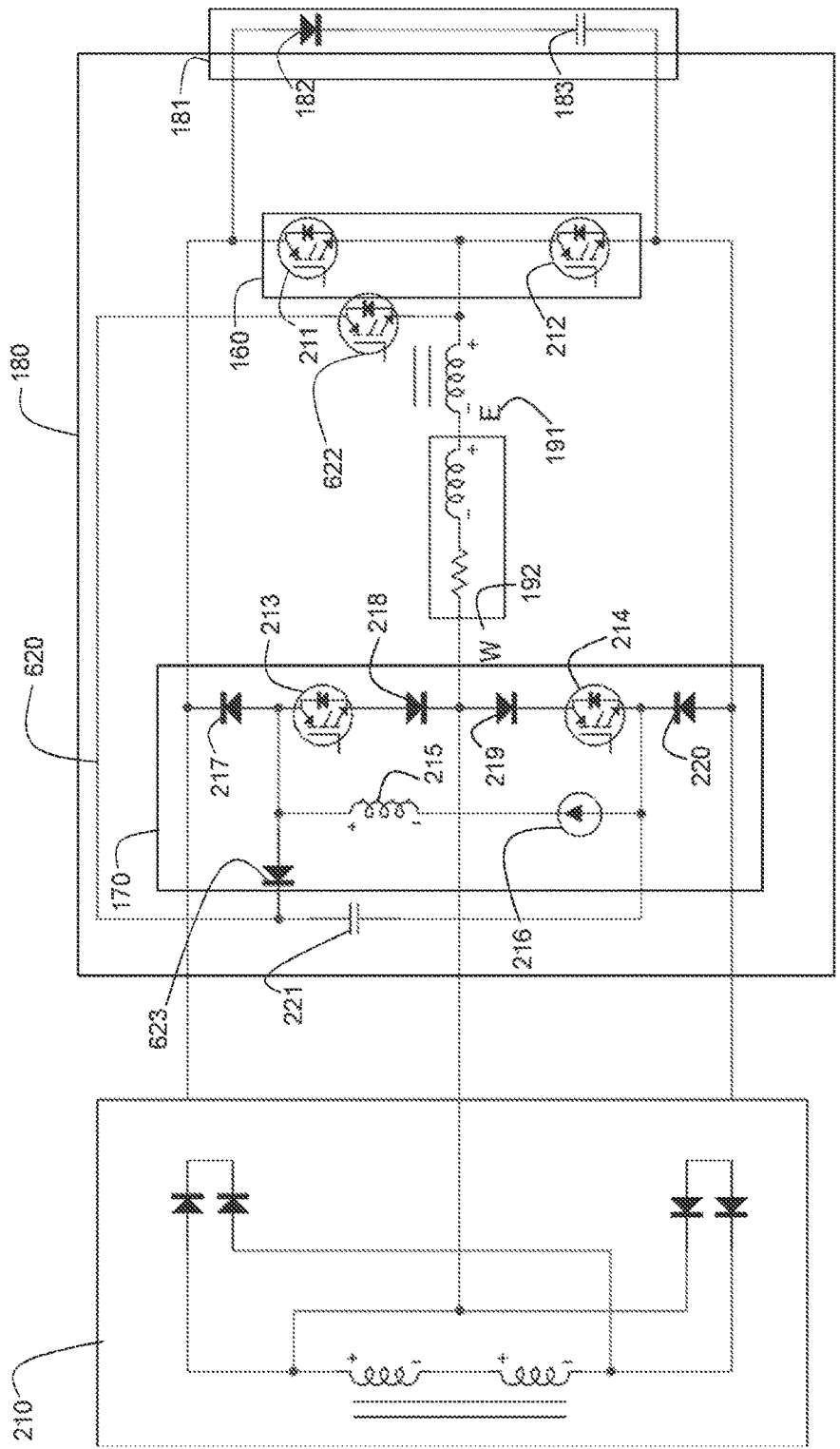
FIG. 6 illustrates a schematic diagram of an alternative embodiment of a portion of the welding power source.

FIG. 6 improves upon the circuit(s) of FIGS. 2-5B by adding independent discharge control path 620. Independent discharge control path 620 includes independent discharge control switch 622 to prevent unintentional freewheeling current paths which are possible in embodiments not including independent discharge control switch 622. Independent discharge control path 620 also includes discharge diode 623.

FIG. 6 also includes various switches to control the paths of current flow. In addition to the other elements depicted, FIG. 6 includes a positive polarity main switch 211, a negative polarity main switch 212, a positive polarity auxiliary switch 214, and a negative polarity auxiliary switch 213.

Figure 7B:
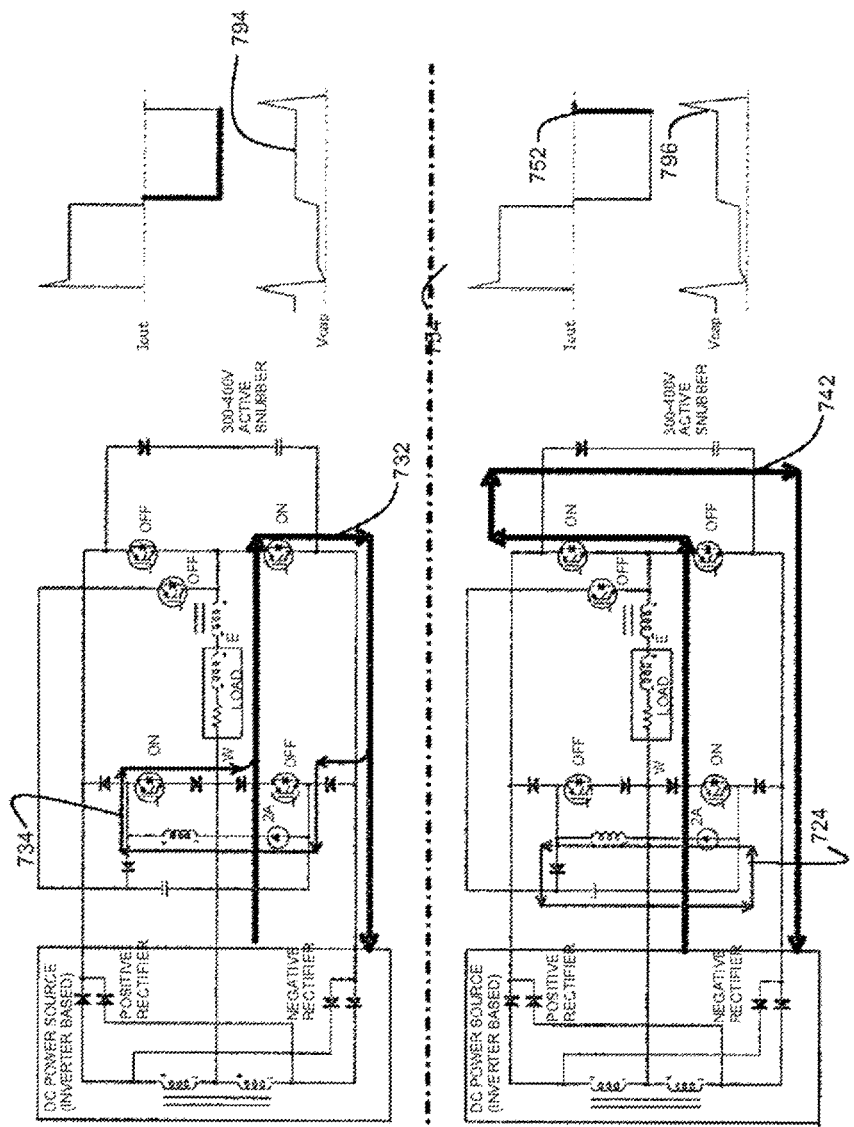
Figure 7C:
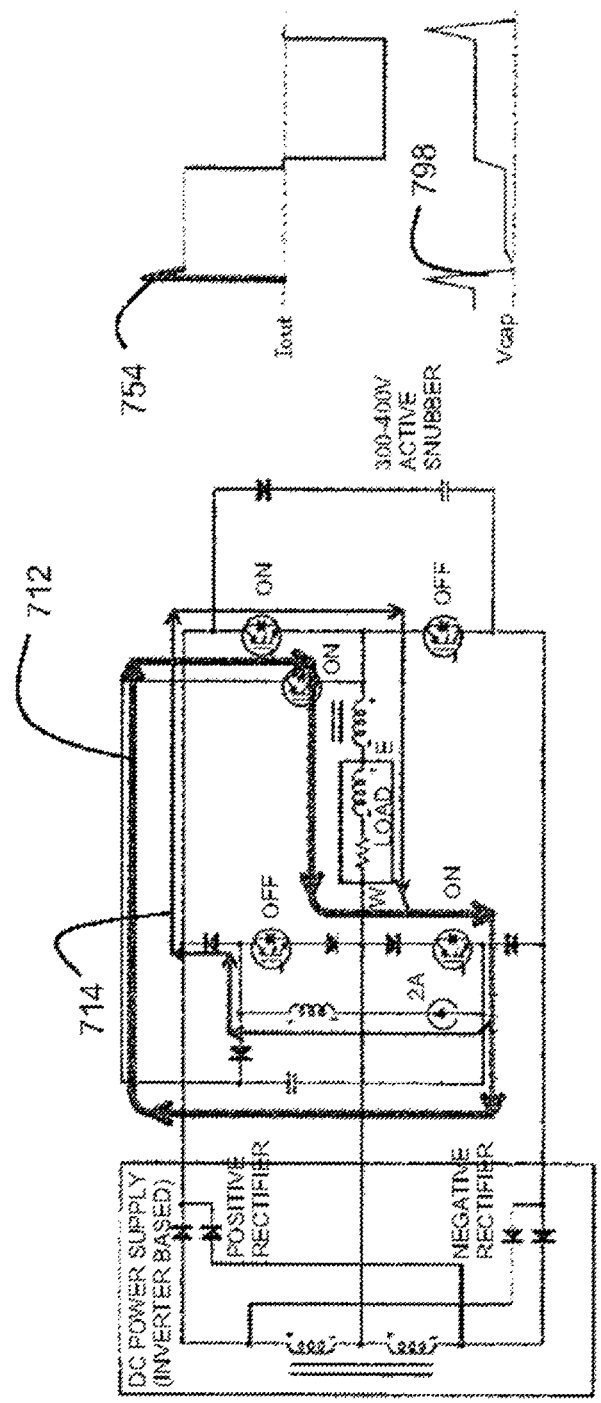

The circuit of FIG. 6 can be implemented in a dual-charge, single-discharge arrangement as shown in FIGS. 7A, 7B, and 7C.

FIG. 7A shows a positive polarity portion of an output current waveform 700. During this portion, positive polarity main switch 211 and positive polarity auxiliary switch 214 are both ON, while negative polarity main switch 212 and negative polarity auxiliary switch 213 are OFF, causing the welding current to flow through positive polarity current main path 712 and current to also flow through positive polarity current auxiliary path 714. Capacitor voltage waveform 790 shows a small increase in voltage increasing the storage of superposition capacitor 221 from zero or background, but in embodiments stabilizes for at least a portion of the positive portion.

FIG. 7A also shows a positive to negative output current polarity transition. During the transition, current flows through positive to negative current transition path 722 based on the switching OFF of positive polarity main switch 211 and positive polarity auxiliary switch 214, and the switching ON of negative polarity main switch 212 and negative polarity auxiliary switch 213. Positive to negative current transition path 722 includes active snubber circuit 181. Current also flows, at least (but not limited to) during deadtime 752, through transition current auxiliary path 724, charging superposition capacitor 221 as indicated by charging side 792 of capacitor voltage waveform 790. No discharge of superposition capacitor 221 occurs on this positive to negative polarity transition.

FIG. 7B shows a negative polarity portion of output current waveform 700. During the negative polarity portion negative polarity main switch 212 and negative polarity auxiliary switch 213 remain ON and positive polarity main switch 211 and positive polarity auxiliary switch 214 remain OFF. Current flows through negative current main path 732, as well as negative current auxiliary path 734. The voltage stored in superposition capacitor 221 remains constant during inactivity period 794.

FIG. 7B also shows the transition between negative and positive polarities. This is caused at least in part by switching ON of positive polarity main switch 211 and positive polarity auxiliary switch 214, and the switching OFF of negative polarity main switch 212 and negative polarity auxiliary switch 213. Current flows through negative polarity current main path 742 decaying through active snubber circuit 181. Current also flows, at least (but not necessarily only) during deadtime 752, through transition current auxiliary path 724. This charges superposition capacitor 221 a second time as shown by second charging side 796, increasing the energy available to re-light the arc after deadtime 752. As illustrated, second charging side 796 corresponds to the length of deadtime 752; however, such periods may be longer or shorter than one another in various embodiments.

FIG. 7C shows arc re-establishment in positive polarity. The arc is re-established through discharge of superposition capacitor 221 as shown on discharge side 798 of capacitor voltage waveform 790, in which the capacitor voltage drops to zero (or background). This discharge corresponds to overshoot 754, shown in output current waveform 700. This discharge supplements the output and background current (if any) to assist in re-establishing the arc after deadtime 752 following a negative to positive polarity transition. Current flows through positive polarity current main path 712 and positive polarity current auxiliary path 714.

Figure 8:
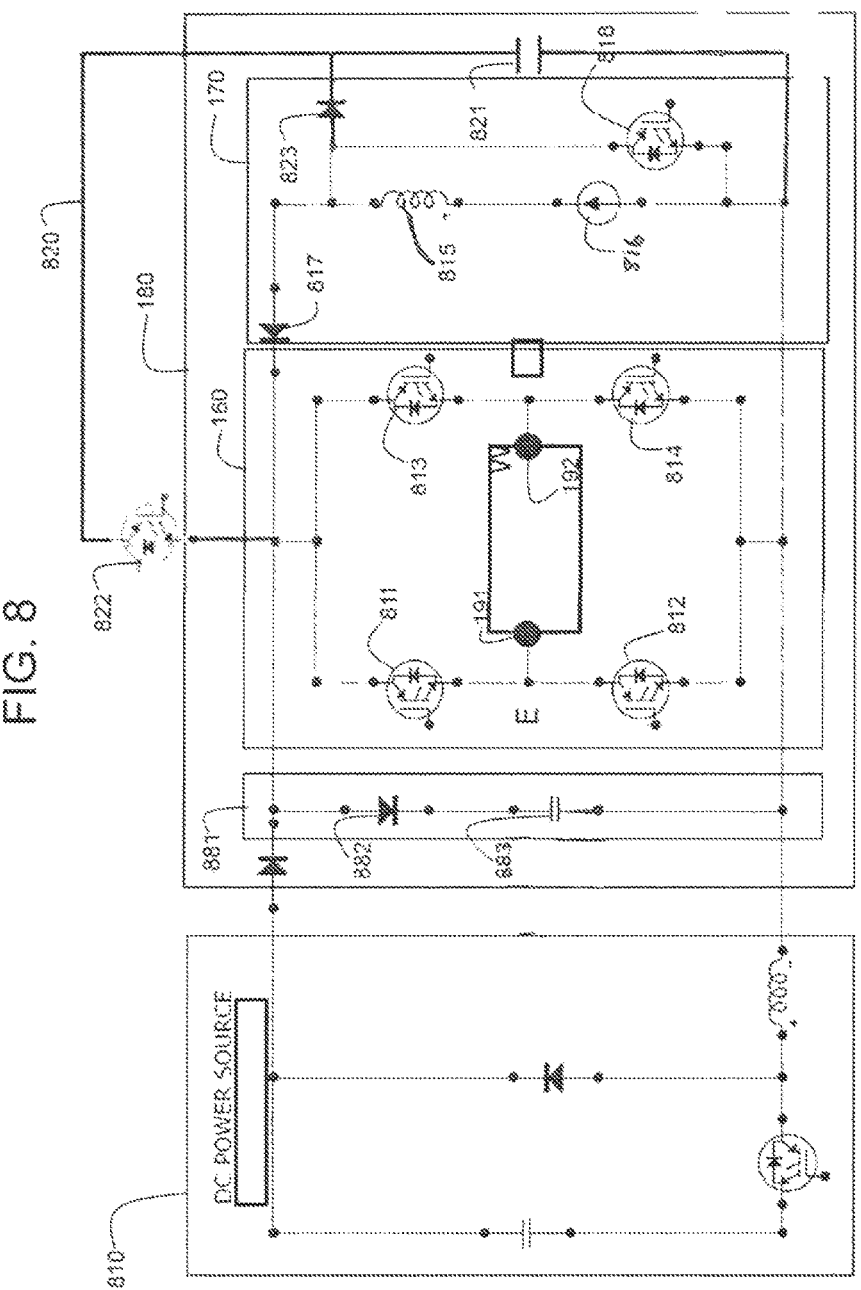
FIG. 8 illustrates a schematic diagram of an alternative embodiment of a portion of the welding power source.

FIG. 8 illustrates a schematic diagram of an embodiment of a portion of the welding power source 100 of FIG. 1 having a bridge circuit 160 and a bi-polar arc regulation circuit 170. Also illustrated in FIG. 8 is a portion 810 of the power conversion circuit 110, where the power conversion circuit 110 provides a DC+output (e.g., a chopper-based circuit). The current switching circuit 180 of FIG. 8 is in the form of a full bridge topology that may be used with almost any power source topology, providing flexibility and the potential to be added to existing designed power sources. FIG. 8 provides a shared H-bridge switching topology, resulting in an implementation that may provide improved low current regulation and arc re-ignition performance.

The bridge circuit 160 includes switching transistors 811, 812, 813, and 814, forming a full H-bridge configuration.

The arc regulation circuit 170 includes an inductor 815, a constant current source 816, diode 817 and, optionally, pre-charge switching transistor 818. In accordance with an embodiment, the switching transistors are insulated gate bipolar transistors (IGBTs). However, other types of switching transistors may be used as well (e.g., metal-oxide semiconductor field effect transistors or MOSFETs), in accordance with other embodiments. An active snubber circuit 881, having a diode 882 and a capacitor 883, is used to limit the voltage across the current switching circuit 180 (e.g., somewhere between 300 V and 600 V) to cause the output current through the output circuit path to decay quickly and to limit or bound the arc re-ignition voltage. The anti-parallel diodes of the switching transistors 811-814 carry the snubber/decay current. The optional pre-charge switching transistor 818 of the arc regulation circuit 170 may be used to pre-charge the inductor 815 with energy. When the pre-charge transistor 818 is on, current from the inductor flows through the pre-charge transistor. Again, as an alternative, pre-charging may be performed by shorting across the switching transistors. Pre-charging of the inductor may be desired such that the inductor has stored energy and is ready to perform initial arc ignition functions (at the start of the welding process) or arc re-ignition functions (at zero crossings) more quickly.

The current switching circuit 180 of FIG. 8 provides for AC welding operation and induces a voltage at the welding output of the welding power source being of sufficient magnitude to re-establish the welding arc between the electrode E and the workpiece W during polarity reversals of the welding process. Welding output terminals 191 and 192 are shown and represent the welding output of the welding power source to which the electrode E and the workpiece W may be connected through a welding cable path.

In accordance with an embodiment, the inductor 815 has an inductance value of between about 10 to 100 millihenries and the constant current source 816 provides a constant current in the range of 2 amps to 10 amps. The constant current source 816 may be any of several different types including, for example, a chopper buck regulator or a simple voltage source and a resistor. The inductor is sized to provide a relatively stable current while inducing a large enough voltage between the electrode and the workpiece to quickly and reliably re-ignite the arc immediately after the arc goes out due to the output current switching direction (polarity reversal/switching).

During zero current crossing (polarity reversal/switching) the arc extinguishes and the high voltage induced by the energy from the inductor of the arc regulation circuit 170 is used to re-establish the arc in the opposite polarity. The inductor keeps current flowing and induces the high voltage up to the limit set by the snubber circuit 881 (e.g., 400 VDC). The inductor induces the high voltage level in either polarity as determined by the state of the switching transistors (e.g., when crossing the zero current point from either direction).

FIG. 8 also shows an alternative embodiment of a circuit having an independent discharge control path 820 including a superposition capacitor 821, independent discharge control switch 822, and discharge diode 823. In this manner, superposition capacitor can be provided to assist with arc re-establishment in the illustrated topology, and unintentional freewheeling currents can be avoided.

Figure 9B:
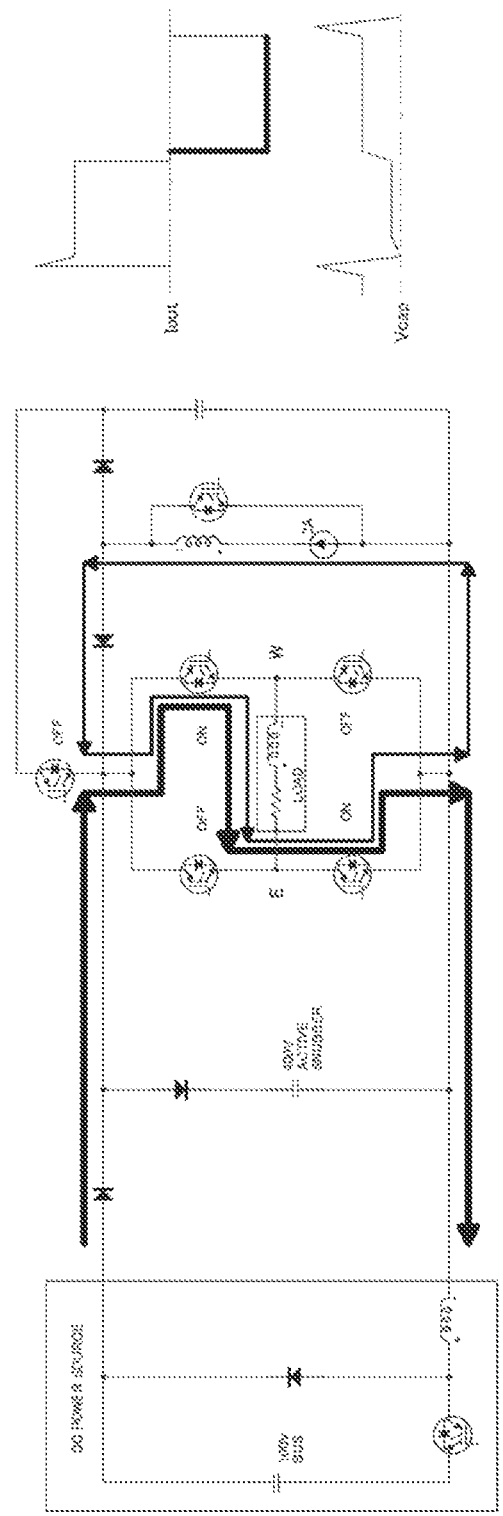

FIGS. 9A-9C illustrates current flow diagrams for the circuit if FIG. 8. FIG. 9A shows the positive polarity pulse and positive polarity decay phase leading to deadtime, superposition element charging, and polarity change from positive to negative. FIG. 9B illustrates a negative polarity pulse current portion of operation of the illustrated circuit. Finally, FIG. 9C illustrates the negative decay and superposition discharge periods of operation of the illustrated circuit. Switch ON/OFF settings are visible in each illustration. While each aspect is not described in the detail set forth above with respect to other figures in the interest of brevity, other terms herein can be used to describe this alternative embodiment without departing from the scope or spirit of the innovation.

Figure 10:
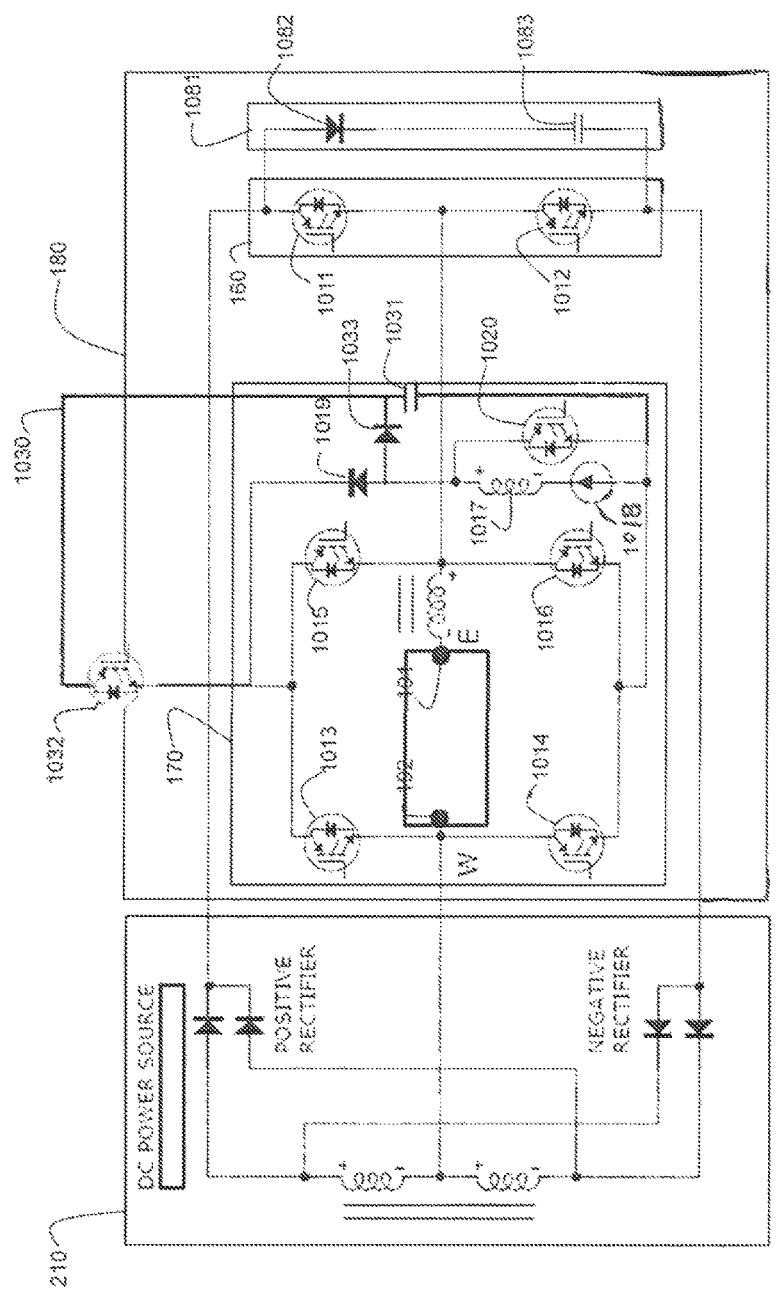
FIG. 10 illustrates a schematic diagram of an alternative embodiment of a portion of the welding power source.

FIG. 10 illustrates a schematic diagram of a second exemplary embodiment of a portion of the welding power source 100 of FIG. 1 having a bridge circuit 160 and a bi-polar arc regulation circuit 170. Also illustrated in FIG. 10 is a portion 210 of the power conversion circuit 110, where the power conversion circuit 110 is a center-tapped or half bridge topology (e.g., an inverter-based circuit). The current switching circuit 180 of FIG. 10 is in the form of a half bridge topology where the power conversion circuit 110 provides dual output current paths configured to share a common path, such that each output path can induce a flow of opposite polarity in the shared path. The operation of the welding power source portion of FIG. 10 is similar to that of FIG. 2. However, FIG. 10 provides a full bridge arc regulation circuit 170 having four switching transistors, resulting in a slightly more sophisticated implementation that may provide improved low current regulation and arc ignition performance over the configuration of FIG. 2.

The bridge circuit 160 includes switching transistors 1011 and 1012. The arc regulation circuit 170 includes switching transistors 1013, 1014, 1015, and 1016, inductor 1017, constant current source 1018, diode 1019 and, optionally, pre-charge switching transistor 1020. In accordance with an embodiment, the switching transistors are insulated gate bipolar transistors (IGBTs). However, other types of switching transistors may be used as well (e.g., metal-oxide semiconductor field effect transistors or MOSFETs), in accordance with other embodiments. An active snubber circuit 1081, having a diode 1082 and a capacitor 1083, is used to limit the voltage across the current switching circuit 180 (e.g., somewhere between 300 V and 600 V) to cause the output current through the output circuit path to decay quickly and bound or limit the arc re-ignition voltage level. The anti-parallel diodes of the switching transistors 1011 and 1012 carry the snubber/decay current. The optional pre-charge switching transistor 1020 of the arc regulation circuit 170 may be used to pre-charge the inductor 1017 with energy. When the pre-charge transistor 1020 is on, current from the inductor 1017 flows through the pre-charge transistor 1020. As an alternative option, pre-charging of the inductor may be accomplished by shorting across the transistors of the arc regulation circuit 170 (e.g., 1013 and 1014, or 1015 and 1016). Pre-charging of the inductor may be desired such that the inductor has stored energy and is ready to perform initial arc ignition functions (at the start of the welding process) or arc re-ignition functions (at zero crossings) more quickly.

The current switching circuit 180 of FIG. 10 provides for AC welding operation and induces a voltage at the welding output of the welding power source being of sufficient magnitude to re-establish the welding arc between the electrode E and the workpiece W during polarity reversals of the welding process. Welding output terminals 191 and 192 are shown and represent the welding output of the welding power source to which the electrode E and the workpiece W may be connected through a welding cable path.

In accordance with an embodiment, the inductor 1017 has an inductance value of between about 10 to 100 millihenries and the constant current source 1018 provides a constant current in the range of 2 amps to 10 amps. The constant current source 1018 may be any of several different types including, for example, a chopper buck regulator or a simple voltage source and a resistor. The inductor is sized to provide a relatively stable current while inducing a large enough voltage between the electrode and the workpiece to quickly and reliably re-ignite the arc immediately after the arc goes out due to the output current switching direction (polarity reversal/switching).

During zero current crossing (polarity reversal/switching) the arc extinguishes and the high voltage induced by the energy from the inductor 1017 of the arc regulation circuit 170 is used to re-establish the arc in the opposite polarity. The inductor 1017 keeps current flowing and induces the high voltage up to the limit set by the snubber circuit 1081 (e.g., 400 VDC). The inductor 1017 induces the high voltage level in either polarity as determined by the state of the switching transistors (e.g., when crossing the zero current point from either direction).

FIG. 10 also shows an alternative embodiment of a circuit having an independent discharge control path 1030 including a superposition capacitor 1031, independent discharge control switch 1032, and discharge diode 1033. In this manner, superposition capacitor can be provided to assist with arc re-establishment in the illustrated topology, and unintentional freewheeling currents can be avoided.

Figure 11A:
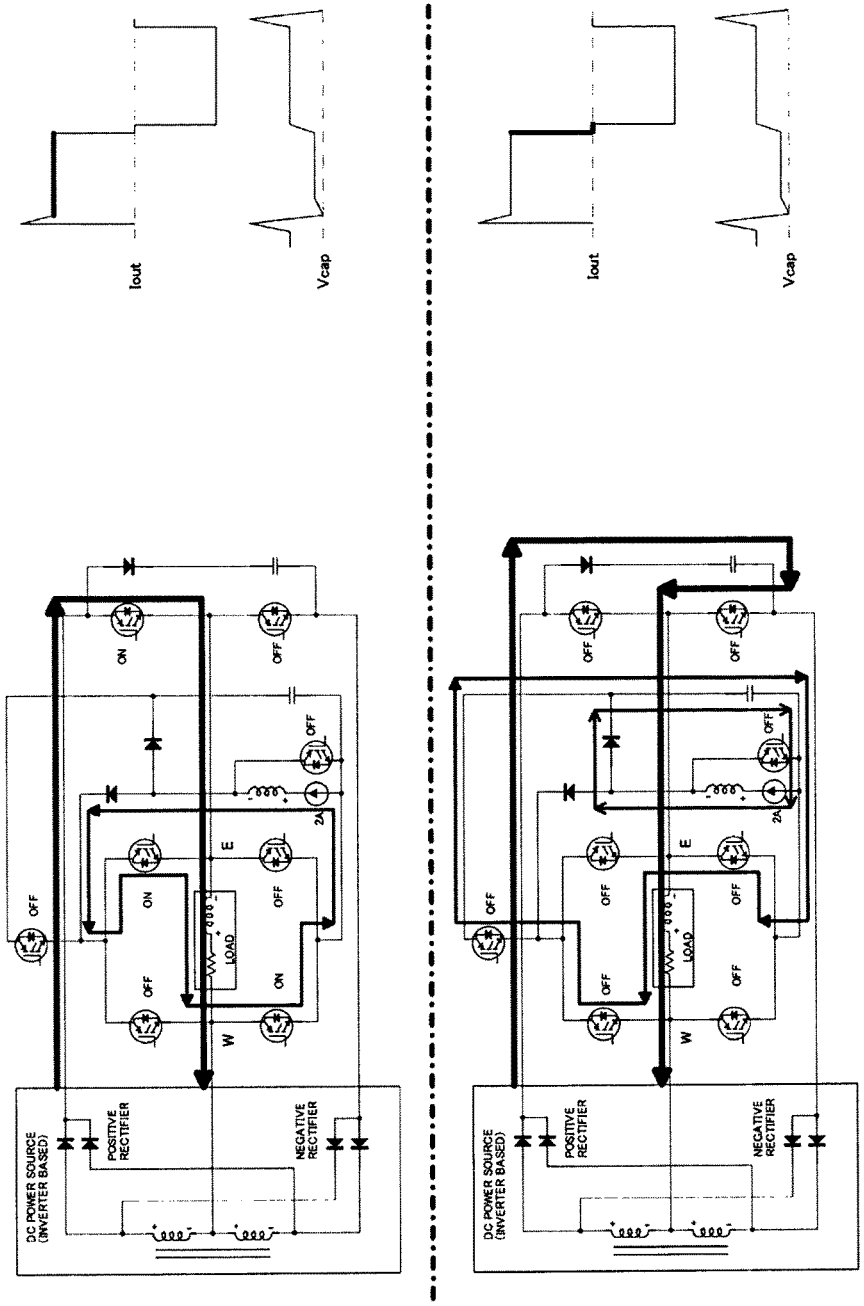
FIGS. 11A-11C illustrate the operation of the welding power source in FIG. 10 when implementing an AC welding output current waveform.
Figure 11B:
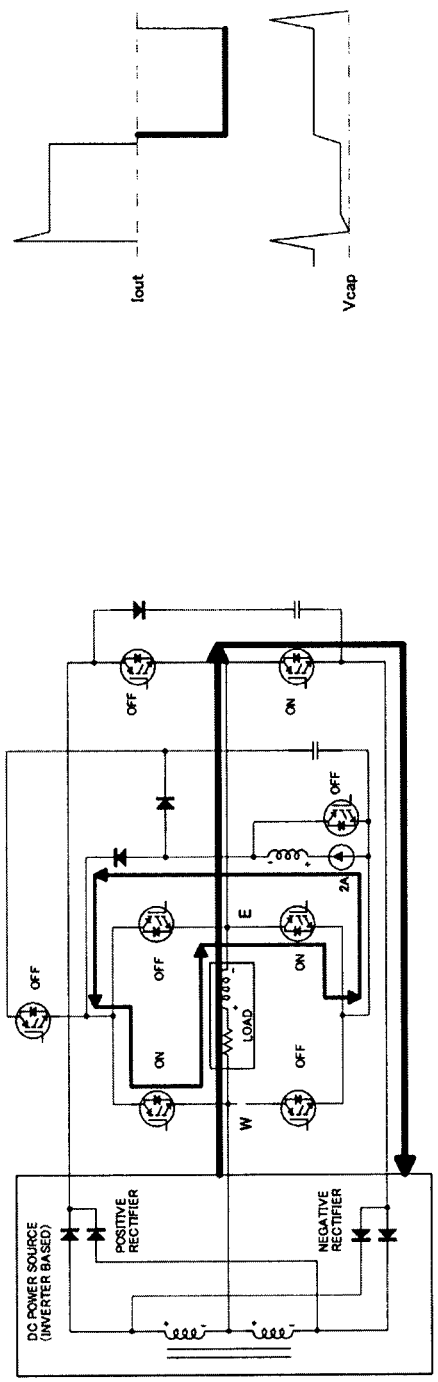
Figure 11C:
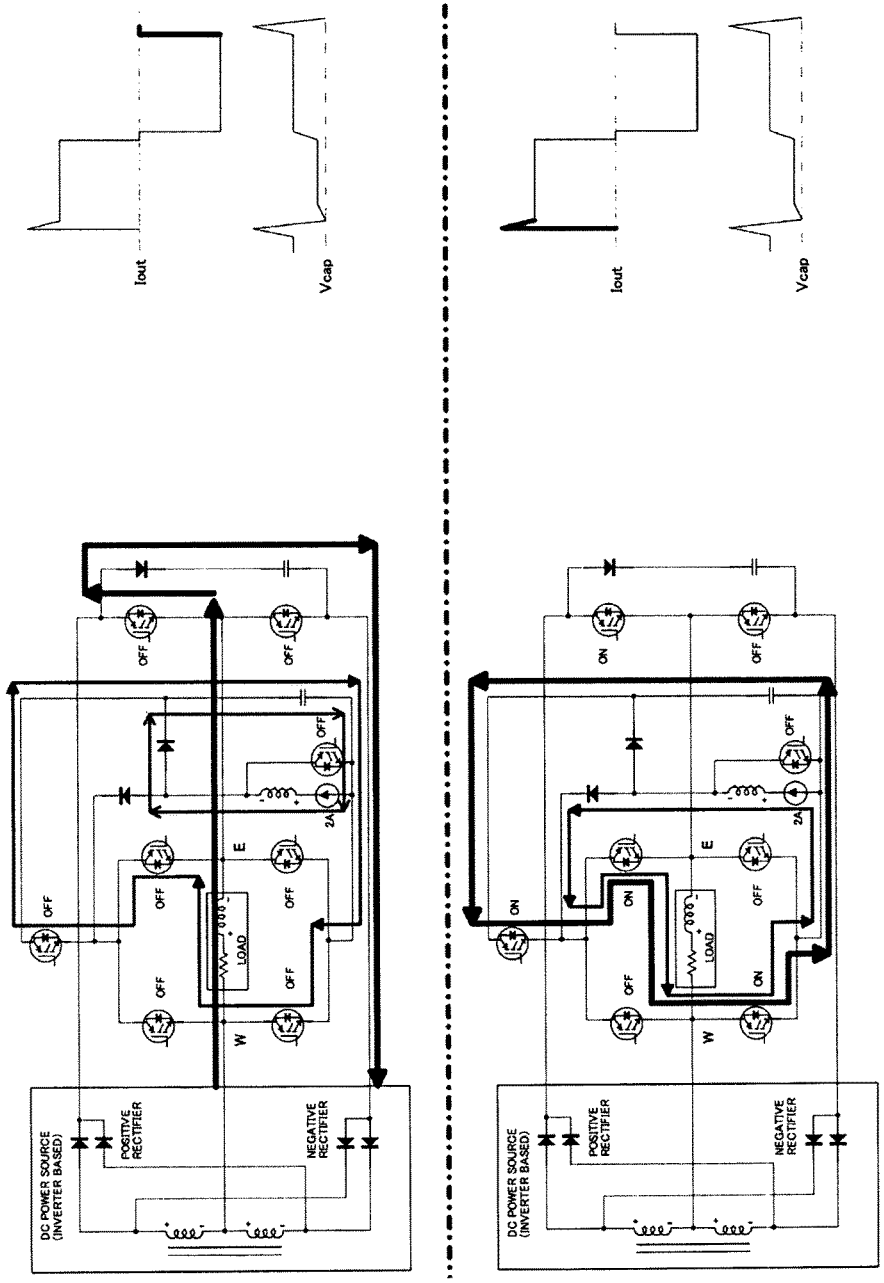

FIGS. 11A-11C illustrates current flow diagrams for the circuit if FIG. 8. FIG. 11A shows the positive polarity pulse and positive polarity decay phase leading to deadtime, superposition element charging, and polarity change from positive to negative. FIG. 11B illustrates a negative polarity pulse current portion of operation of the illustrated circuit. Finally, FIG. 11C illustrates the negative decay and superposition discharge periods of operation of the illustrated circuit. Switch ON/OFF settings are visible in each illustration. While each aspect is not described in the detail set forth above with respect to other figures in the interest of brevity, other terms herein can be used to describe this alternative embodiment without departing from the scope or spirit of the innovation.

Thus, embodiments herein can include a system, comprising a welding power conversion circuit configured to convert an input current to an output current, a plurality of switches and corresponding current paths. The current paths include at least a positive polarity main switch on a positive polarity current main path, the positive polarity current main path includes a welding path from an electrode to a workpiece, a positive polarity auxiliary switch on a positive polarity current auxiliary path and a polarity transition auxiliary path, a negative polarity main switch on a negative polarity current main path, the negative polarity current main path includes the welding path from the workpiece to the electrode, a negative polarity auxiliary switch on a negative polarity current auxiliary path and the polarity transition auxiliary path, and an independent discharge control switch on an independent discharge control current path. The system further includes a controller configured to switch at least one of the plurality of switches; and a superposition element configured to discharge stored energy in response to a polarity change in the output current, the superposition element configured to charge at least when current flows through the polarity transition auxiliary path.

Further aspects herein can include similar systems in which the positive polarity current main path and negative polarity current main path include a common active snubber circuit. In embodiments, the common active snubber circuit includes at least a diode and a capacitor.

Further aspects herein can include similar systems in which all of the positive polarity current auxiliary path, negative polarity current auxiliary path, and polarity transition auxiliary path include an inductor. In alternative or complementary embodiments, the superposition element charges at least during a deadtime associated with the polarity change.

Further aspects herein can include similar systems in which the superposition element discharges once per polarity cycle, the polarity cycle includes both a positive polarity portion and a negative polarity portion. In alternative or complementary embodiments, the polarity change in response to which the superposition element discharges is a negative to positive change in output current polarity.

Further aspects herein can include similar systems in which the superposition element discharges to an independent discharge control path.

Embodiments herein can further include a method comprising converting an input current to an output current in a welding power source, switching a welding current direction through at least a positive polarity current main path and a negative polarity current main path, switching an auxiliary current direction through at least a positive polarity current auxiliary path, negative polarity current auxiliary path, and a polarity transition auxiliary path, charging a superposition element using at least the polarity transition auxiliary path, and inducing a voltage through at least one of the positive polarity current main path and negative polarity current main path in response to a change in an output current polarity, the voltage is induced by discharging the superposition element through an independent discharge control current path.

Further aspects herein can include similar methods in which the positive polarity current main path and negative polarity current main path include a common active snubber circuit. In alternative or complementary embodiments, the common active snubber circuit includes at least a diode and a capacitor.

Further aspects herein can include similar methods in which all of the positive polarity current auxiliary path, negative polarity current auxiliary path, and polarity transition auxiliary path include an inductor. In further embodiments, the superposition element charges at least during a deadtime associated with the polarity change. In an alternative further embodiment, the superposition element discharges once per polarity cycle, the polarity cycle includes both a positive polarity portion and a negative polarity portion. In further aspects, the polarity change in response to which the superposition element discharges is a negative to positive change in output current polarity. In another alternative arrangement, the superposition element discharges to an independent discharge control path.

Embodiments herein further include a system comprising means for converting an input current to an output current in a welding power source, means for switching a welding current direction through at least a positive polarity current main path and a negative polarity current main path, and means for switching an auxiliary current direction through at least a positive polarity current auxiliary path, negative polarity current auxiliary path, and a polarity transition auxiliary path. There are additionally means for charging a superposition element using at least the polarity transition auxiliary path, and means for inducing a voltage through at least one of the positive polarity current main path and negative polarity current main path in response to a change in an output current polarity, the voltage is induced by discharging the superposition element through an independent discharge control current path.

Further aspects herein can include similar systems in which the superposition element charges at least during a deadtime associated with the polarity change. In alternative or complementary embodiments, the superposition element discharges once per polarity cycle, the polarity cycle includes both a positive polarity portion and a negative polarity portion. In still further embodiments, the polarity change in response to which the superposition element discharges is a negative to positive change in output current polarity.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," et cetera are used merely as labels, and are not intended to impose numerical or positional requirements on their objects. Further, the limitations of the appended claims are not written in means-plus-function format and are not intended to be interpreted based on 35 U.S.C. § 112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

While the embodiments discussed herein have been related to the systems and methods discussed above, these embodiments are intended for purposes of example and are not intended to limit the applicability of these embodiments to only those discussions set forth herein. The systems and methodologies discussed herein may be equally applicable to, and may be utilized in, systems and methods related to arc welding, laser welding, brazing, soldering, plasma cutting, waterjet cutting, laser cutting, and any other systems or methods using similar control methodology, without departing from the spirit or scope of the above discussed inventions. The embodiments and discussions herein can be readily incorporated into any of these systems and methodologies by those of skill in the art. By way of example and not limitation, a power supply as used herein (e.g., welding power supply, among others) can be a power supply for a device that performs welding, arc welding, laser welding, brazing, soldering, plasma cutting, waterjet cutting, laser cutting, among others. Thus, one of sound engineering and judgment can choose power supplies other than a welding power supply departing from the intended scope of coverage of the embodiments of the subject invention.

What is claimed is:
1. A system, comprising:
   a welding power conversion circuit configured to convert an input current to an output current;
   a plurality of switches and corresponding current paths including at least:
      a positive polarity main switch on a positive polarity current main path, the positive polarity current main path includes a welding path from an electrode to a workpiece,
      a positive polarity auxiliary switch on a positive polarity current auxiliary path and a polarity transition auxiliary path,
      a negative polarity main switch on a negative polarity current main path, the negative polarity current main path includes the welding path from the workpiece to the electrode,
      a negative polarity auxiliary switch on a negative polarity current auxiliary path and the polarity transition auxiliary path, and
      an independent discharge control switch on an independent discharge control current path;
   a controller that controls operations of at least one of the plurality of switches; and
   a superposition element configured to discharge stored energy in response to a polarity change in the output current, the superposition element configured to charge at least when current flows through the polarity transition auxiliary path, wherein the independent discharge control switch is operatively connected to the superposition element to control the discharge of the stored energy through the independent discharge control current path to the welding path, and wherein the superposition element discharges once per polarity cycle in response to the polarity change in the output current, and the polarity change is a negative to positive polarity change in the output current.

2. The system of claim 1, the positive polarity current main path and negative polarity current main path include a common active snubber circuit.

3. The system of claim 2, the common active snubber circuit includes at least a diode and a capacitor.

4. The system of claim 1, all of the positive polarity current auxiliary path, negative polarity current auxiliary path, and polarity transition auxiliary path include an inductor.

5. The system of claim 1, the superposition element charges at least during a deadtime associated with the polarity change.

6. The system of claim 1, the superposition element discharges to an independent discharge control path.

7. A system, comprising:
a welding power conversion circuit configured to convert an input current to an output current;
a plurality of switches and corresponding current paths including at least:
 a positive polarity main switch on a positive polarity current main path, the positive polarity current main path includes a welding path from an electrode to a workpiece,
 a positive polarity auxiliary switch on a positive polarity current auxiliary path,
 a negative polarity main switch on a negative polarity current main path, the negative polarity current main path includes the welding path from the workpiece to the electrode,
 a negative polarity auxiliary switch on a negative polarity current auxiliary path, and
a controller that controls operations of at least one of the plurality of switches; and
a superposition capacitor configured to discharge stored energy in response to a polarity change in the output current, the superposition capacitor configured to charge by current flow through a polarity transition auxiliary path,
wherein the superposition capacitor discharges once per polarity cycle in response to the polarity change in the output current, and the polarity change is a negative to positive polarity change in the output current.

8. The system of claim 7, wherein the positive polarity current main path and the negative polarity current main path include a common active snubber circuit.

9. The system of claim 8, wherein the common active snubber circuit includes at least a diode and a capacitor.

10. The system of claim 7, wherein the superposition capacitor charges at least during a deadtime associated with the polarity change.

11. A system, comprising:
a welding power conversion circuit configured to convert an input current to an output current;
a plurality of switches and corresponding current paths including at least:
 a positive polarity main switch on a positive polarity current main path, the positive polarity current main path includes a welding path from an electrode to a workpiece,
 a positive polarity auxiliary switch on a positive polarity current auxiliary path,
 a negative polarity main switch on a negative polarity current main path, the negative polarity current main path includes the welding path from the workpiece to the electrode,
 a negative polarity auxiliary switch on a negative polarity current auxiliary path, and
 an independent discharge control switch on an independent discharge control current path;
a controller that controls operations of at least one of the plurality of switches; and
a superposition capacitor configured to discharge stored energy in response to a polarity change in the output current, the superposition capacitor configured to charge by current flow through a polarity transition auxiliary path,
wherein the independent discharge control switch is operatively connected to the superposition capacitor to control the discharge of the stored energy through the independent discharge control current path to the welding path, and
wherein the superposition capacitor discharges once per polarity cycle in response to the polarity change in the output current, and the polarity change is a negative to positive polarity change in the output current.

12. The system of claim 11, wherein the positive polarity current main path and the negative polarity current main path include a common active snubber circuit.

13. The system of claim 12, wherein the common active snubber circuit includes at least a diode and a capacitor.

14. The system of claim 11, wherein the superposition capacitor charges at least during a deadtime associated with the polarity change.

* * * * *